(12) United States Patent
Puzio et al.

(10) Patent No.: US 9,067,266 B2
(45) Date of Patent: Jun. 30, 2015

(54) BIT RETENTION DEVICE

(71) Applicant: BLACK & DECKER INC., Newark, DE (US)

(72) Inventors: Daniel Puzio, Baltimore, MD (US); Robert G. Kusmierski, York, PA (US)

(73) Assignee: BLACK & DECKER INC., Newark, DE (US)

( * ) Notice: Subject to any disclaimer, the term of this patent is extended or adjusted under 35 U.S.C. 154(b) by 0 days.

(21) Appl. No.: 14/317,279

(22) Filed: Jun. 27, 2014

(65) Prior Publication Data

US 2014/0312578 A1    Oct. 23, 2014

Related U.S. Application Data

(63) Continuation of application No. 13/560,520, filed on Jul. 27, 2012, now Pat. No. 8,800,999, which is a continuation-in-part of application No. 12/394,426, filed on Feb. 27, 2009, now Pat. No. 8,622,401, and a continuation-in-part of application No. 12/769,981, filed on Apr. 29, 2010, now Pat. No. 8,381,830.

(60) Provisional application No. 61/175,583, filed on May 5, 2009.

(51) Int. Cl.
*B23B 31/107* (2006.01)
*B25B 23/00* (2006.01)

(52) U.S. Cl.
CPC ....... *B23B 31/107* (2013.01); *Y10T 279/17752* (2015.01); *Y10T 279/17196* (2015.01); *Y10T 279/17188* (2015.01); *B23B 31/1071* (2013.01); *B25B 23/0035* (2013.01); *B25B 23/0057* (2013.01); *Y10S 279/905* (2013.01); *B23B 2231/00* (2013.01)

(58) Field of Classification Search
CPC .............. B23B 31/107; B23B 31/1071; B23B 323/0035; B23B 23/0035; B23B 23/0057; B23B 2231/00; Y10S 279/905
USPC ............................ 279/29, 30, 22, 74, 75, 905
See application file for complete search history.

(56) References Cited

U.S. PATENT DOCUMENTS

| 1,119,276 | A | * | 12/1914 | Griffith et al. | 279/75 |
|---|---|---|---|---|---|
| 1,124,981 | A | * | 1/1915 | Weaver | 279/75 |
| 1,138,465 | A | * | 5/1915 | Fegley et al. | 279/82 |
| 1,656,450 | A | * | 1/1928 | Steuer | 279/22 |
| 1,860,998 | A | * | 5/1932 | Drazick | 279/76 |
| 1,938,440 | A | * | 12/1933 | Richard | 279/30 |

(Continued)

FOREIGN PATENT DOCUMENTS

| DE | 1789996 | 6/1959 |
|---|---|---|
| DE | 1161817 | 1/1964 |

(Continued)

*Primary Examiner* — Eric A Gates
*Assistant Examiner* — Bayan Salone
(74) *Attorney, Agent, or Firm* — Scott B. Markow

(57) ABSTRACT

A bit retention device includes a shaft having a sidewall defining a hexagonal cavity extending from a first end thereof and a ball groove extending through the sidewall and communicating with the hexagonal cavity. A ball is disposed in the ball groove and a ball spring engages the ball and biases the ball toward the first end. An actuator sleeve surrounding the shaft includes an internal ramp engaging the ball. A spring biased plunger assembly is disposed in the bore for biasing a bit received in the bore in a direction toward the insertion end.

20 Claims, 23 Drawing Sheets

(56) References Cited

U.S. PATENT DOCUMENTS

| | | | | |
|---|---|---|---|---|
| 2,348,611 A * | | 5/1944 | Davidson | 188/67 |
| 2,409,899 A * | | 10/1946 | Resina | 279/22 |
| 2,570,570 A * | | 10/1951 | Lee | 279/23.1 |
| 2,708,589 A * | | 5/1955 | Masek | 285/277 |
| 3,019,027 A * | | 1/1962 | Klein et al. | 279/30 |
| 3,398,965 A * | | 8/1968 | Cox | 279/30 |
| 3,436,086 A * | | 4/1969 | Glenzer | 279/30 |
| 3,599,765 A * | | 8/1971 | Turner et al. | 192/56.61 |
| 3,726,533 A * | | 4/1973 | Lafferty, Sr. | 279/97 |
| 3,732,026 A * | | 5/1973 | Peters | 408/124 |
| 3,767,218 A * | | 10/1973 | Linthicum et al. | 279/75 |
| 3,788,658 A * | | 1/1974 | Benjamin et al. | 279/75 |
| 3,929,343 A * | | 12/1975 | Wanner et al. | 279/81 |
| 4,002,348 A * | | 1/1977 | Johnson | 279/75 |
| 4,068,559 A * | | 1/1978 | Schmid et al. | 409/233 |
| 4,131,165 A * | | 12/1978 | Wanner et al. | 173/48 |
| 4,184,692 A * | | 1/1980 | Benson et al. | 279/75 |
| 4,309,042 A * | | 1/1982 | Fauth et al. | 279/75 |
| 4,317,578 A * | | 3/1982 | Welch | 279/60 |
| 4,347,753 A * | | 9/1982 | Claussen et al. | 74/110 |
| 4,502,824 A * | | 3/1985 | Dohse et al. | 409/234 |
| 4,577,875 A * | | 3/1986 | Miyakawa | 279/75 |
| 4,588,335 A * | | 5/1986 | Pearson, Jr. | 408/239 R |
| 4,629,375 A * | | 12/1986 | Lieser | 408/239 R |
| 4,669,932 A * | | 6/1987 | Hartley | 408/239 R |
| 4,692,073 A * | | 9/1987 | Martindell | 408/239 A |
| 4,701,083 A * | | 10/1987 | Deutschenbaur et al. | 408/240 |
| 4,793,053 A * | | 12/1988 | Zuccaro et al. | 279/4.01 |
| 4,824,298 A * | | 4/1989 | Lippacher et al. | 408/240 |
| 4,858,939 A * | | 8/1989 | Riggs | 279/75 |
| 5,000,631 A * | | 3/1991 | Deutschenbaur et al. | 408/240 |
| 5,013,194 A * | | 5/1991 | Wienhold | 408/240 |
| 5,029,505 A * | | 7/1991 | Holliday | 83/652 |
| 5,062,749 A * | | 11/1991 | Sheets | 279/75 |
| 5,188,378 A * | | 2/1993 | Erlenkeuser | 279/22 |
| 5,199,833 A * | | 4/1993 | Fehrle et al. | 408/239 R |
| 5,284,069 A * | | 2/1994 | Wellman | 76/107.1 |
| 5,398,946 A * | | 3/1995 | Quiring | 279/30 |
| 5,447,397 A * | | 9/1995 | Asano | 408/59 |
| 5,584,689 A * | | 12/1996 | Loge | 433/128 |
| 5,664,634 A * | | 9/1997 | McCracken | 173/48 |
| 5,709,391 A * | | 1/1998 | Arakawa et al. | 279/19.4 |
| 5,709,393 A * | | 1/1998 | von Keudell et al. | 279/97 |
| 5,906,378 A * | | 5/1999 | Nordquist | 279/4.06 |
| 5,934,384 A * | | 8/1999 | Wang | 173/132 |
| 5,951,024 A * | | 9/1999 | Montjoy et al. | 279/43 |
| 5,951,026 A * | | 9/1999 | Harman et al. | 279/143 |
| 5,984,596 A * | | 11/1999 | Fehrle et al. | 408/226 |
| 5,996,452 A * | | 12/1999 | Chiang | 81/429 |
| 5,997,225 A * | | 12/1999 | Young et al. | 409/182 |
| 6,053,675 A * | | 4/2000 | Holland et al. | 408/239 R |
| 6,074,140 A * | | 6/2000 | Cook | 408/240 |
| 6,079,716 A * | | 6/2000 | Harman et al. | 279/75 |
| 6,126,370 A * | | 10/2000 | Wheeler et al. | 408/239 R |
| 6,135,462 A * | | 10/2000 | Robison | 279/137 |
| 6,179,300 B1 * | | 1/2001 | Baumann et al. | 279/19.4 |
| 6,193,242 B1 * | | 2/2001 | Robison | 279/137 |
| 6,199,872 B1 * | | 3/2001 | Hasan | 279/30 |
| 6,224,303 B1 * | | 5/2001 | Wheeler et al. | 408/239 R |
| 6,234,491 B1 * | | 5/2001 | Wheeler | 279/143 |
| 6,241,026 B1 * | | 6/2001 | Wache et al. | 173/132 |
| 6,261,035 B1 * | | 7/2001 | Moores et al. | 408/239 R |
| 6,270,085 B1 * | | 8/2001 | Chen et al. | 279/22 |
| 6,293,559 B1 * | | 9/2001 | Harman et al. | 279/22 |
| 6,311,989 B1 * | | 11/2001 | Rosanwo | 279/75 |
| 6,325,393 B1 * | | 12/2001 | Chen et al. | 279/22 |
| 6,343,901 B2 * | | 2/2002 | Wheeler et al. | 408/239 R |
| 6,354,177 B2 * | | 3/2002 | Peters | 81/439 |
| 6,364,033 B1 * | | 4/2002 | Hung et al. | 173/217 |
| 6,382,636 B1 * | | 5/2002 | Walker | 279/60 |
| 6,390,739 B1 * | | 5/2002 | O'Banion | 408/239 R |
| 6,457,916 B2 * | | 10/2002 | Wienhold | 408/240 |
| 6,464,234 B2 * | | 10/2002 | Frauhammer et al. | 279/19.4 |
| 6,474,656 B1 * | | 11/2002 | Thomas | 279/30 |
| 6,499,908 B2 | | 12/2002 | Hauptmann et al. | |
| 6,511,100 B1 | | 1/2003 | Le Clinche | |
| 6,517,297 B2 * | | 2/2003 | Cochran et al. | 408/226 |
| 6,520,050 B1 * | | 2/2003 | Gildroy | 81/44 |
| 6,520,508 B1 * | | 2/2003 | Jordan | 279/46.7 |
| 6,524,035 B1 * | | 2/2003 | Robison | 408/211 |
| 6,543,959 B1 * | | 4/2003 | Jore | 403/322.2 |
| 6,568,717 B1 | | 5/2003 | Le Clinche | |
| 6,622,597 B2 * | | 9/2003 | Chen | 81/58.3 |
| 6,637,755 B2 * | | 10/2003 | Chen et al. | 279/22 |
| 6,651,990 B2 * | | 11/2003 | Higasi et al. | 279/19.4 |
| 6,666,114 B1 * | | 12/2003 | Lin | 81/438 |
| 6,688,610 B2 * | | 2/2004 | Huggins et al. | 279/22 |
| 6,695,321 B2 * | | 2/2004 | Bedi et al. | 279/22 |
| 6,722,667 B2 * | | 4/2004 | Cantlon | 279/22 |
| 6,755,423 B2 * | | 6/2004 | Chiu | 279/30 |
| 6,786,685 B2 * | | 9/2004 | Schaub et al. | 408/240 |
| 6,834,864 B2 * | | 12/2004 | Girardeau | 279/60 |
| 6,860,489 B2 * | | 3/2005 | Chen | 279/82 |
| 6,863,280 B2 * | | 3/2005 | Chiu | 279/82 |
| 6,902,358 B2 * | | 6/2005 | Thomas | 408/226 |
| 6,913,089 B2 * | | 7/2005 | Stirm | 173/104 |
| 6,920,810 B1 | | 7/2005 | Thompson et al. | |
| 6,929,266 B2 * | | 8/2005 | Peters et al. | 279/82 |
| 6,973,858 B2 * | | 12/2005 | Huang | 81/177.85 |
| 6,986,517 B2 * | | 1/2006 | Lin | 279/74 |
| 7,051,635 B2 * | | 5/2006 | Morehead | 83/698.31 |
| 7,063,332 B2 * | | 6/2006 | Muller | 279/75 |
| 7,086,813 B1 * | | 8/2006 | Boyle et al. | 408/239 R |
| 7,111,530 B2 * | | 9/2006 | Huang | 81/438 |
| 7,121,774 B2 * | | 10/2006 | Hirt et al. | 408/240 |
| 7,156,187 B1 * | | 1/2007 | Townsan | 173/1 |
| 7,159,493 B1 * | | 1/2007 | Huang | 81/438 |
| 7,222,862 B2 * | | 5/2007 | Buchholz et al. | 279/19.3 |
| 7,250,023 B2 * | | 7/2007 | Bai | 483/30 |
| 7,287,449 B2 * | | 10/2007 | Abel et al. | 81/177.2 |
| 7,290,470 B1 * | | 11/2007 | Peters | 81/439 |
| 7,306,396 B1 * | | 12/2007 | Chen | 403/327 |
| 7,308,948 B2 * | | 12/2007 | Furuta | 173/48 |
| 7,316,404 B1 * | | 1/2008 | Walker | 279/60 |
| 7,380,612 B2 * | | 6/2008 | Furuta | 173/29 |
| 7,380,613 B2 * | | 6/2008 | Furuta | 173/48 |
| 7,387,054 B2 * | | 6/2008 | Rajotte | 81/429 |
| 7,424,841 B2 * | | 9/2008 | Liu | 81/438 |
| 7,452,006 B2 | | 11/2008 | Kohda | |
| 7,500,811 B2 * | | 3/2009 | Pfob | 408/56 |
| 7,503,734 B2 * | | 3/2009 | Puzio | 408/240 |
| 7,597,155 B2 * | | 10/2009 | Ullrich et al. | 173/29 |
| 7,654,779 B2 * | | 2/2010 | Sasaki et al. | 408/240 |
| 7,661,725 B2 | | 2/2010 | Kouda | |
| 7,810,817 B1 * | | 10/2010 | Gao | 279/75 |
| 7,845,428 B2 * | | 12/2010 | Sakamaki et al. | 173/164 |
| 7,871,080 B2 * | | 1/2011 | Marini et al. | 279/71 |
| 7,918,286 B2 * | | 4/2011 | Nagasaka et al. | 173/93 |
| 7,926,855 B2 * | | 4/2011 | Kitagawa | 285/316 |
| 8,024,865 B2 * | | 9/2011 | Kaiser et al. | 30/392 |
| 8,172,235 B2 * | | 5/2012 | Furusawa et al. | 279/19.4 |
| 8,366,120 B2 * | | 2/2013 | Hu | 279/82 |
| 8,381,830 B2 * | | 2/2013 | Puzio et al. | 173/29 |
| 8,550,471 B2 * | | 10/2013 | Huang | 279/30 |
| 8,622,401 B2 * | | 1/2014 | Puzio et al. | 279/30 |
| 8,690,164 B2 * | | 4/2014 | Meng | 279/75 |
| 8,800,999 B2 * | | 8/2014 | Puzio et al. | 279/75 |
| 8,820,431 B2 * | | 9/2014 | Puzio et al. | 173/48 |
| 2001/0033777 A1 * | | 10/2001 | Peters | 408/12 |
| 2001/0046421 A1 * | | 11/2001 | Cochran et al. | 408/239 R |
| 2003/0025281 A1 * | | 2/2003 | Higasi et al. | 279/19.4 |
| 2003/0057661 A1 * | | 3/2003 | Thomas | 279/30 |
| 2003/0230862 A1 * | | 12/2003 | Peters et al. | 279/82 |
| 2004/0013488 A1 * | | 1/2004 | Schaub et al. | 409/239 |
| 2004/0094909 A1 * | | 5/2004 | Chiu | 279/80 |
| 2004/0188959 A1 * | | 9/2004 | Chen | 279/82 |
| 2005/0036844 A1 * | | 2/2005 | Hirt et al. | 408/240 |
| 2006/0048613 A1 * | | 3/2006 | Abel et al. | 81/177.2 |
| 2006/0097464 A1 * | | 5/2006 | Strauch et al. | 279/75 |
| 2006/0111723 A1 * | | 5/2006 | Chapolini et al. | 606/80 |
| 2007/0152408 A1 * | | 7/2007 | Peters | 279/143 |
| 2007/0204730 A1 * | | 9/2007 | Rajotte | 81/429 |
| 2008/0072718 A1 * | | 3/2008 | Liu | 81/438 |
| 2008/0184852 A1 * | | 8/2008 | Peters | 81/439 |

(56) References Cited

U.S. PATENT DOCUMENTS

| | | | |
|---|---|---|---|
| 2008/0184854 A1* | 8/2008 | Peters | 81/451 |
| 2009/0008886 A1* | 1/2009 | Shu | 279/103 |
| 2010/0282485 A1* | 11/2010 | Puzio et al. | 173/217 |
| 2010/0308547 A1* | 12/2010 | Fukinuki et al. | 279/134 |
| 2012/0025474 A1* | 2/2012 | Huang | 279/30 |
| 2012/0326401 A1* | 12/2012 | Puzio et al. | 279/75 |

FOREIGN PATENT DOCUMENTS

| | | | |
|---|---|---|---|
| DE | 2117628 A1 | 10/1972 | |
| DE | 2629472 | 1/1978 | |
| DE | 2934428 | 3/1981 | |
| DE | 3243389 | 5/1984 | |
| DE | 3324756 | 1/1985 | |
| DE | 4210911 A1 | 10/1993 | |
| DE | 4243650 | 6/1994 | |
| DE | 4403906 A1 | 9/1994 | |
| DE | 4427933 A1 | 11/1995 | |
| DE | 19932369 | 1/2001 | |
| DE | 20106986 | 9/2001 | |
| DE | 10105406 A1 | 8/2002 | |
| DE | 10219418 A1 | 11/2003 | |
| DE | 202008011435 U1 | 1/2009 | |
| DE | 202008015046 U1 | 3/2009 | |
| DE | 102007048822 A1 | 4/2009 | |
| DE | 202009001905 U1 | 7/2009 | |
| DE | 202009009115 U1 | 11/2009 | |
| DE | 202009017128 U1 | 3/2010 | |
| DE | 202011050549 U1 | 11/2011 | |
| DE | 202012100244 U1 | 5/2012 | |
| EP | 0134975 | 3/1985 | |
| EP | 0175088 A1 | 3/1986 | |
| EP | 0325087 A1 | 7/1989 | |
| EP | 0462257 | 12/1991 | |
| EP | 00959587 A2 | 11/1999 | |
| EP | 1043101 A2 | 10/2000 | |
| EP | 1123172 A1 | 8/2001 | |
| EP | 1218135 A1 | 7/2002 | |
| EP | 1369194 A2 | 12/2003 | |
| EP | 1375071 A2 | 1/2004 | |
| EP | 1409207 A2 | 4/2004 | |
| EP | 1557254 A1 | 7/2005 | |
| EP | 1671729 A2 | 6/2006 | |
| EP | 1690618 | 8/2006 | |
| EP | 1803515 A2 | 7/2007 | |
| EP | 1880801 A1 | 1/2008 | |
| EP | 1897658 A1 | 3/2008 | |
| EP | 01913150 A2 | 4/2008 | |
| EP | 1955819 A1 | 8/2008 | |
| EP | 1955820 A1 | 8/2008 | |
| EP | 2067577 A1 | 6/2009 | |
| EP | 2151304 A2 | 2/2010 | |
| GB | 2174934 A | 11/1986 | |
| GB | 2275216 A | 8/1994 | |
| JP | 2004106473 A | 4/2004 | |
| WO | 0000314 A1 | 1/2000 | |
| WO | 0115842 A1 | 3/2001 | |
| WO | 0164400 A1 | 9/2001 | |
| WO | 03018263 | 3/2003 | |
| WO | 2004028402 A2 | 4/2004 | |

* cited by examiner

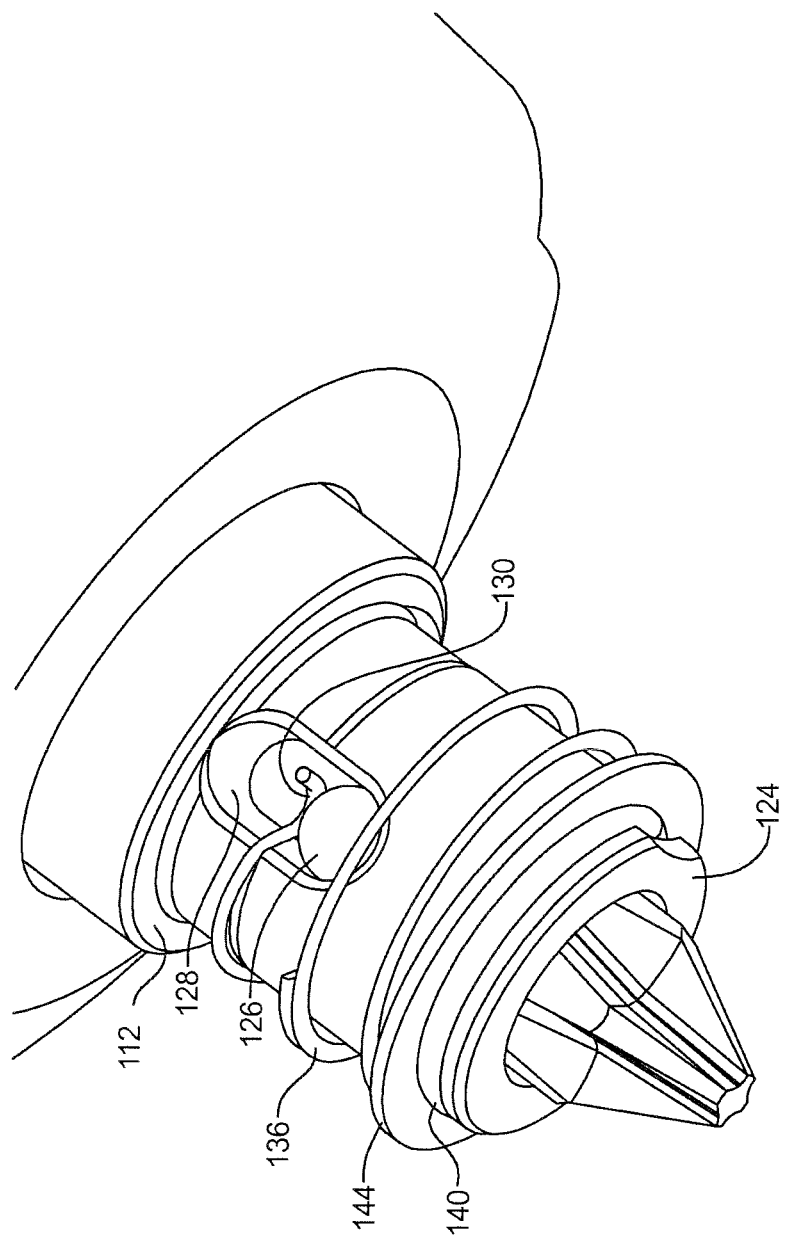

BIT RETENTION DEVICE

CROSS-REFERENCE TO RELATED APPLICATIONS

This application is a continuation of U.S. patent application Ser. No. 13/560,520, filed Jul. 27, 2012, which is a continuation-in-part application of U.S. patent application Ser. No. 12/394,426, filed on Feb. 27, 2009, and a continuation-in-part application of U.S. patent application Ser. No. 12/769,981, filed on Apr. 29, 2010 which claims priority to U.S. Provisional Application No. 61/175,583, filed on May 5, 2009. The entire disclosures of the above applications are incorporated herein by reference.

FIELD

The present disclosure relates to power or hand tool bit retention devices, variously known as "auxiliary chucks," "chucks," "adapters," or "bit holders" for removably receiving tool bits, such as fastener drivers, drill bits, or the like, for rotation therewith when the power tool is actuated or the hand tool is manually rotated. More particularly, the present disclosure relates to a bit retention device configured for rapid and easy insertion and removal of a bit.

BACKGROUND AND SUMMARY

This section provides background information related to the present disclosure which is not necessarily prior art.

Bit retention devices for power and hand tools have become increasingly common, especially as the need and desirability of wider versatility and the use of power tools and hand tools has increased. Such bit retention devices allow the hand or power tool to be used with any of a number of interchangeable bits. This, in turn, has resulted in demands for greater speed, convenience, and ease for insertion and removal of tool bits from the bit retention device.

In one exemplary type of conventional bit retention device, one or more detent balls are positioned within a hollow, barrel-shaped tool bit holder body and are resiliently biased into engagement with a circumferentially-extending groove or recess on the shank of the tool bit. Although this basic design has performed well, such conventional quick-release bit retention devices frequently require the operator to actuate a sleeve, collar, or other component part during both the insertion and the removal of the tool bit.

Accordingly, the present disclosure seeks to provide a bit retention device that requires the operator to actuate its components only upon tool bit removal. A "snap-in" type of bit retention device is provided for a drill, driver, or other rotary hand or power tool. The bit retention device includes a shaft having a sidewall defining a hexagonal cavity extending from a first end thereof and a ball groove extending through the sidewall and communicating with the hexagonal cavity. A ball is disposed in the ball groove and a ball spring engages the ball and biases the ball toward the first end. An actuator sleeve surrounds the shaft and includes an internal ramp engaging the ball. The internal ramp includes a shallow ramp portion having a first angle of inclination with respect to a center axis of the shaft and a steep portion having a second angle of inclination with respect to the center axis of the shaft that is greater than the first angle of inclination. The steep portion includes a smaller diameter than the shallow ramp portion.

According to another aspect, the present disclosure provides a bit retention device, wherein a spring biased plunger biases the bit out of engagement with the ball when the actuator sleeve is pulled forward.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 27 is a perspective view of the bit retention device shown in FIG. 25 with the actuator sleeve removed for illustrative purposes.

Corresponding reference numerals indicate corresponding parts throughout the several views of the drawings.

DETAILED DESCRIPTION

Figure 1:
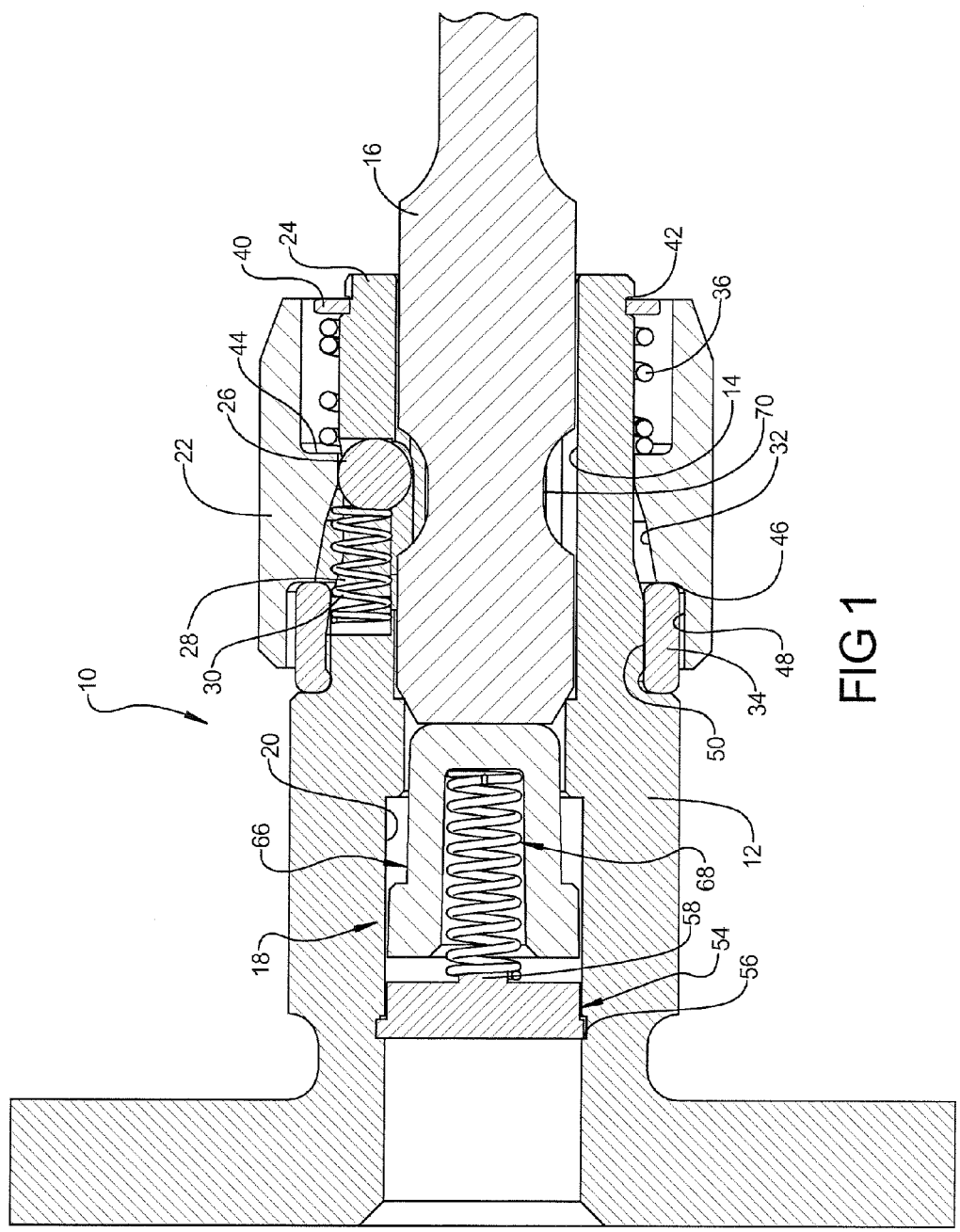
FIG. 1 is a longitudinal cross-sectional view of a bit retention device according to the principles of the present disclosure.
Figure 2:
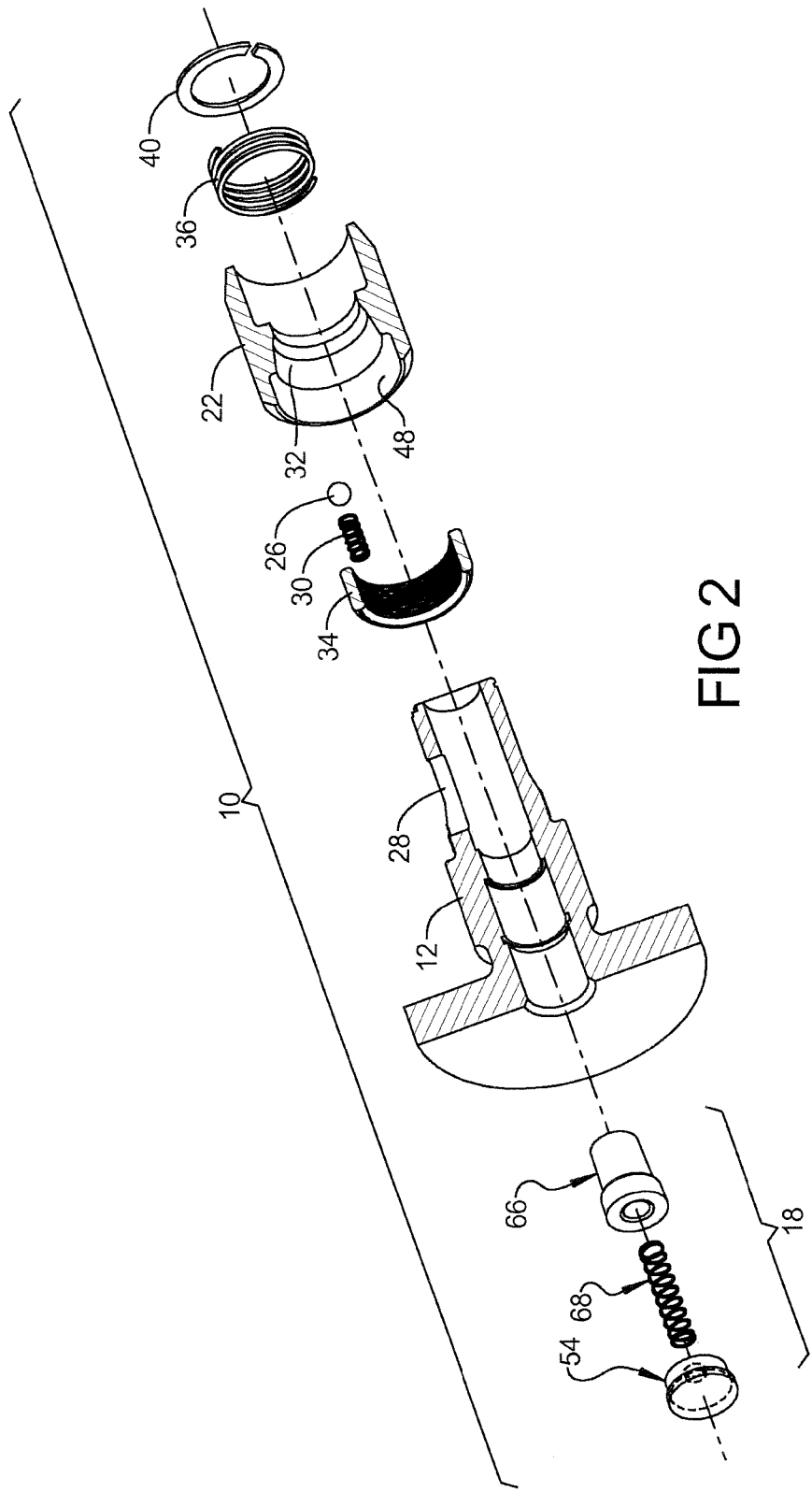
FIG. 2 is an exploded perspective view of the bit retention device shown in FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.).

Spatially relative terms, such as "inner," "outer," "forward," "rearward," "lower," "above," "upper" and the like, may be used herein for ease of description to describe one element or feature's relationship to another element(s) or feature(s) as illustrated in the figures.

With reference to the accompanying Figures, the bit retention device 10 according to the principles of the present disclosure will now be described. The bit retention device 10 includes a shaft 12 defining a polygonal cavity 14 for receiving a tool bit or the like 16. The polygonal cavity 14 can be hexagonal. A plunger sub-assembly 18 is received in a bore 20 extending from the polygonal cavity 14. An actuator sleeve 22 is disposed around a first end 24 of the shaft 12 and engages a ball 26 that is received in a ball groove 28 of the shaft 12. A ball spring 30 is disposed in the ball groove 28 and biases the ball 26 against an interior ramp 32 of the actuator sleeve 22. A ball spring retainer sleeve 34 surrounds the shaft 12 and retains a second end of the ball spring 30 within the ball groove 28.

An actuator spring 36 biases the actuator sleeve 22 in a rearward direction relative to the first end 24 of the shaft 12. A retainer clip 40 is received in a recessed groove 42 in the first end 24 of the shaft 12 and disposed against a forward end of the actuator spring 36. A second end of the actuator spring 36 is received against an interior shoulder portion 44 of the actuator sleeve 22 in order to bias the actuator sleeve 22 in a rearward direction relative to the first end 24 of the shaft 12. The actuator sleeve 22 includes a rear shoulder portion 46 that can be located adjacent to the ramp 32 and can engage the ball spring retainer sleeve 34 at a forward end thereof to limit rearward movement of the actuator sleeve 22. The actuator sleeve 22 can include a rearwardly extending cylindrical guide portion 48 that engages an outer surface of the ball spring retainer sleeve 34 for sliding engagement therewith. The ball spring retainer sleeve 34 can include an internal diameter portion 50 that snuggly receives the shaft 12 therein.

Figure 3:
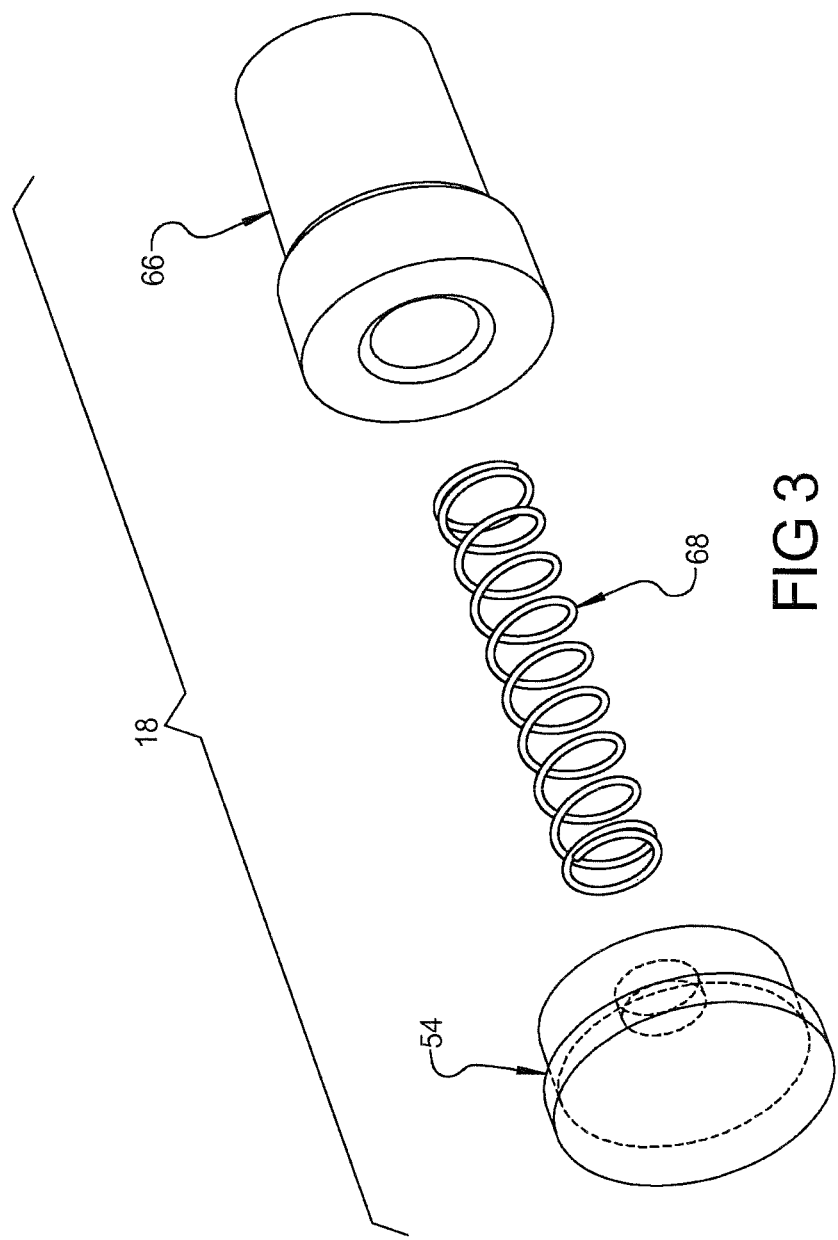
FIG. 3 is an exploded perspective view of the plunger sub-assembly according to the principles of the present disclosure.

With reference to FIG. 3, the plunger assembly 18 can include a spring seat 54 that is adapted to be press fit into a receiving groove 56 within the bore 20 as illustrated in FIG. 1. The spring seat 54 includes a center post 58 which is adapted to receive a plunger spring 68 thereon. A plunger member 66 is disposed against a forward end of the plunger spring 68.

The plunger member 66 has a recessed cavity 60 for receiving the plunger spring 68. The plunger sub-assembly 18 is inserted into the rear end of the bore 20 so that the forward end of the spring 68 engages the plunger member 66. The spring seat 54 is inserted into the bore 20 until the spring seat 54 engages the receiving groove 56 within the bore 20. The plunger member 66 is designed to slide freely within the bore 20 while the spring 68 biases the plunger member 66 toward the first end 24 of shaft 12.

Figure 4:
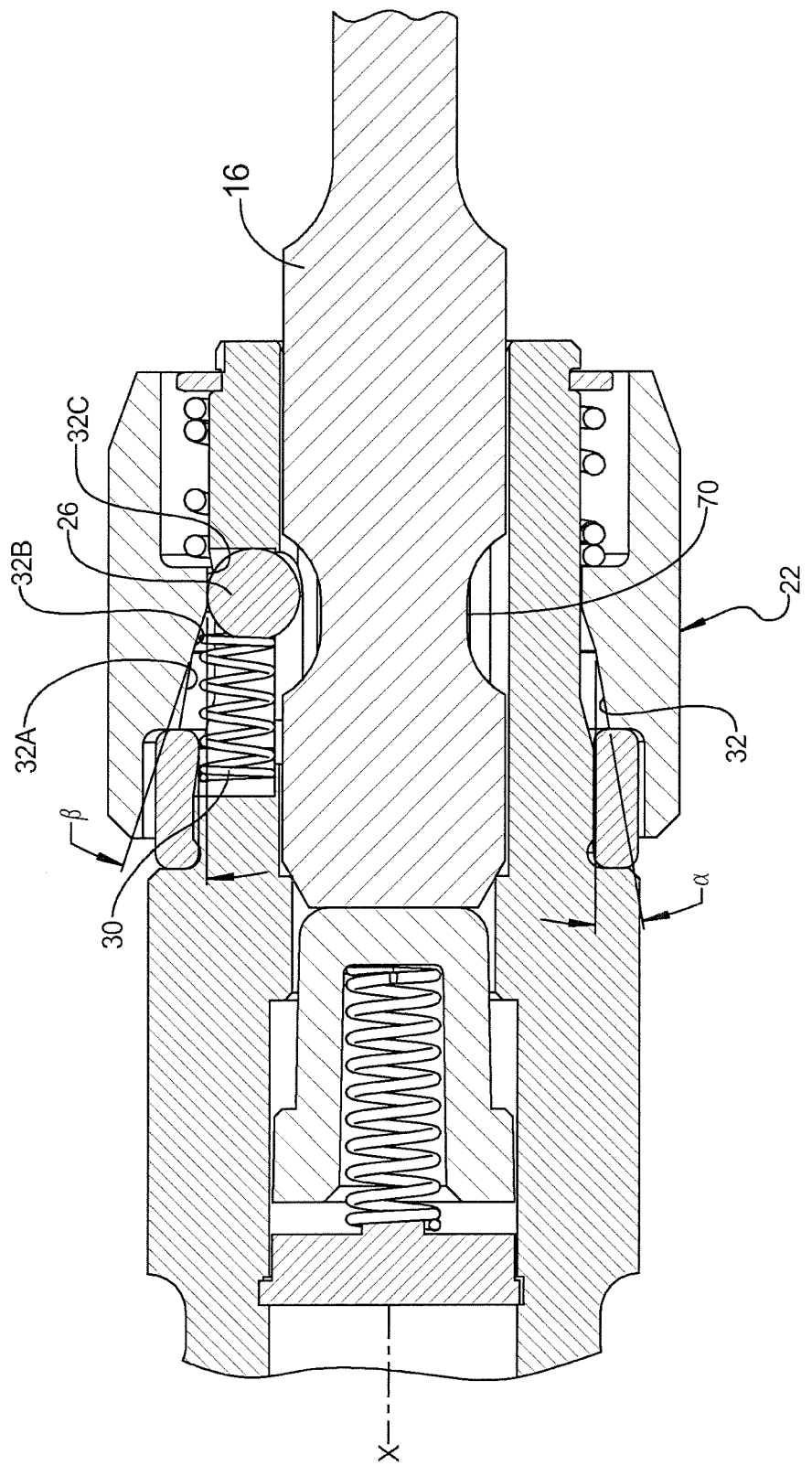
FIG. 4 is an enlarged cross-sectional view of the bit retention device shown in FIG. 1 and illustrating the details of the ramp on the interior surface of the actuation sleeve, according to the principles of the present disclosure.

With reference to FIG. 4, the ramp 32 of the actuator sleeve 22 will now be described. The ramp 32 includes a shallow ramp portion 32A and a steep ramp portion 32B. The shallow ramp portion 32A has a first angle of inclination $\alpha$ relative to the central axis X of the shaft 12 that can be between 5 and 15 degrees, and more particularly about 10 degrees. The steep ramp portion 32B has a second angle of inclination $\beta$ relative to the central axis X that is larger than the angle of inclination α of the shallow ramp portion 32A. The steep ramp portion 32B can have an angle of inclination β relative to the central axis X that is between 13 and 23 degrees, and more particularly about 18 degrees. The ramp portion 32 can further include a third ramp portion 32C that is generally parallel to the axis X of the shaft 12 thereby defining a cylindrical wall portion thereon. The angles and positions of ramp portions 32A and 32B are such that they allow the ball to pass the corner of the groove 70 of the power bit 16. In other words, the dimensions from the corner of the groove to ramp surfaces 32A and 32B are greater than the ball diameter when the sleeve is seated in its rearward position. The spring 30 urges the ball 26 past the corner of the groove in the power bit to its fully forward position. The ramp surface 32B and surface 32C direct the ball into greater engagement with the groove 70 in the power bit 16.

During assembly, the plunger sub-assembly 18 is inserted into the bore 20 until the spring seat 54 is disposed within the receiving groove 56 within the bore 20. The ball spring retaining sleeve 34 is then slid over the shaft 12, and the ball spring 30 and ball 26 are inserted into the ball groove 28 so that the ball spring retaining sleeve 34 overlaps the rear end of the ball spring 30 in order to retain the ball spring 30 within the ball groove 28. The actuator sleeve 22 is then inserted onto the end of the shaft 12 and the actuator spring 36 is slid over the end of the shaft 12 inside of the actuator sleeve 22 so that the actuator spring 36 abuts against the shoulder portion 44 of the actuator sleeve 22. The retaining clip 40 is then installed on the shaft 12 so that the retainer clip 40 is received in the recessed groove 42 at the first end 24 of the shaft 12.

It should be noted that the shaft 12 can be designed to be permanently installed on a rotating shaft of a power tool or can alternatively be designed to be removably engaged from a power tool or a hand tool. The bit retention device 10 can be utilized for retaining various types of hexagonal bits such as screwdriver bits and drill bits.

Figure 5:
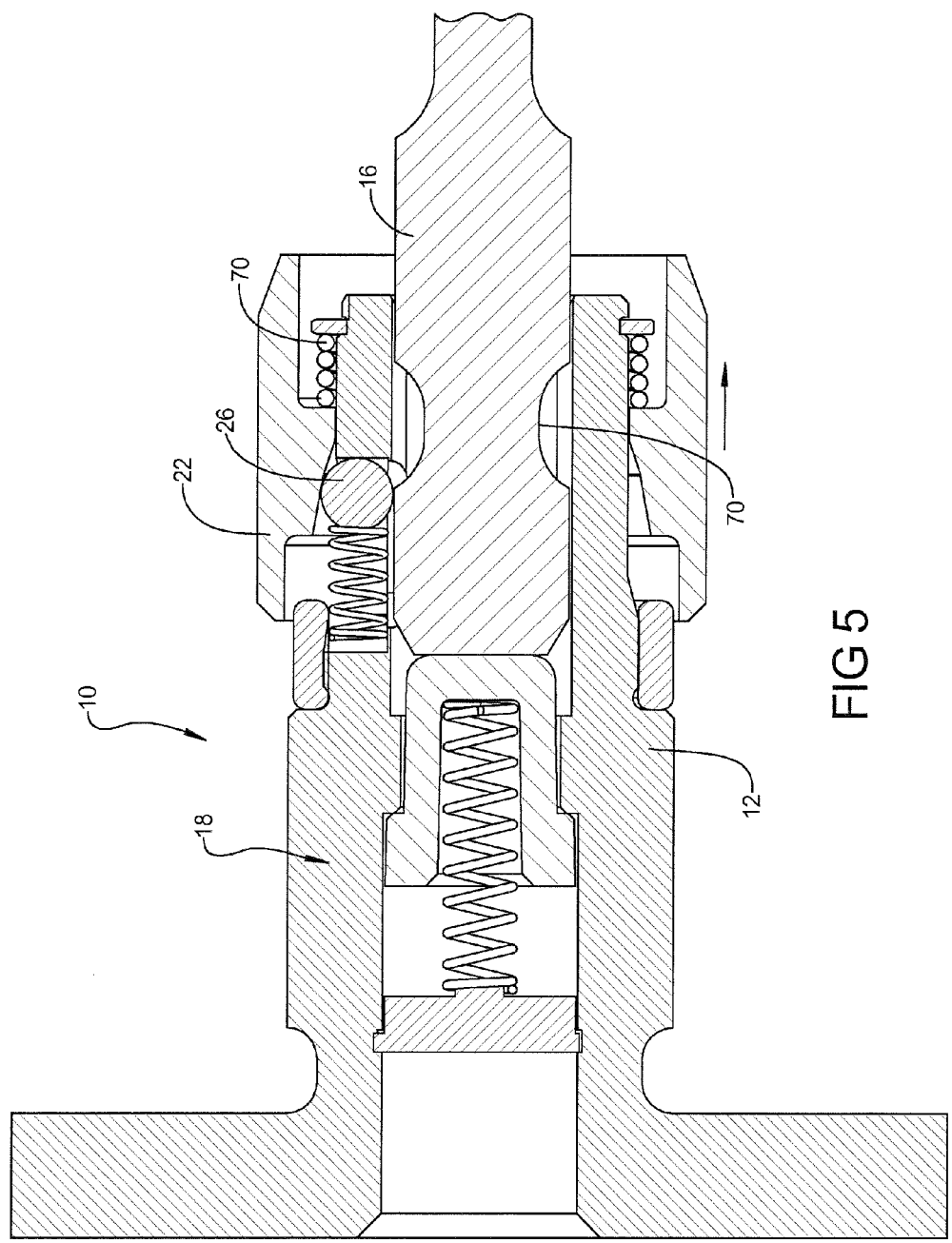
FIG. 5 is a cross-sectional view of the bit holder device shown with the sleeve pulled in a forward release position for allowing the removal of the tool bit.

A common form of bit is referred to as a "power bit" which includes a hexagonal shank portion having an annular radiused groove 70 therein that is designed to receive a ball or other retaining member of a retention device. An exemplary "power bit"-type bit is illustrated in FIGS. 1, 2, and 5-8. When the bit retention device 10 of the present disclosure is utilized for retaining a power bit, the ball 26 is received in the annular groove 70 of the bit 16 as illustrated in FIG. 1. In this position, the ramp portion 32C retains the ball within the annular groove 70 of the bit 16. In order to release the bit 16 from the retention device 10, the actuator sleeve 22 is pulled in a forward direction as illustrated in FIG. 5 so that the ball 26 is able to move radially outward out of the annular groove 70 and the plunger assembly 18 pushes the bit forward so that the ball groove 70 is no longer in alignment with the ball 26. The sleeve 22 can then be released and the bit 16 can be extracted with the same hand, thus making it a simple one hand operation to remove the bit 16.

Figure 6:
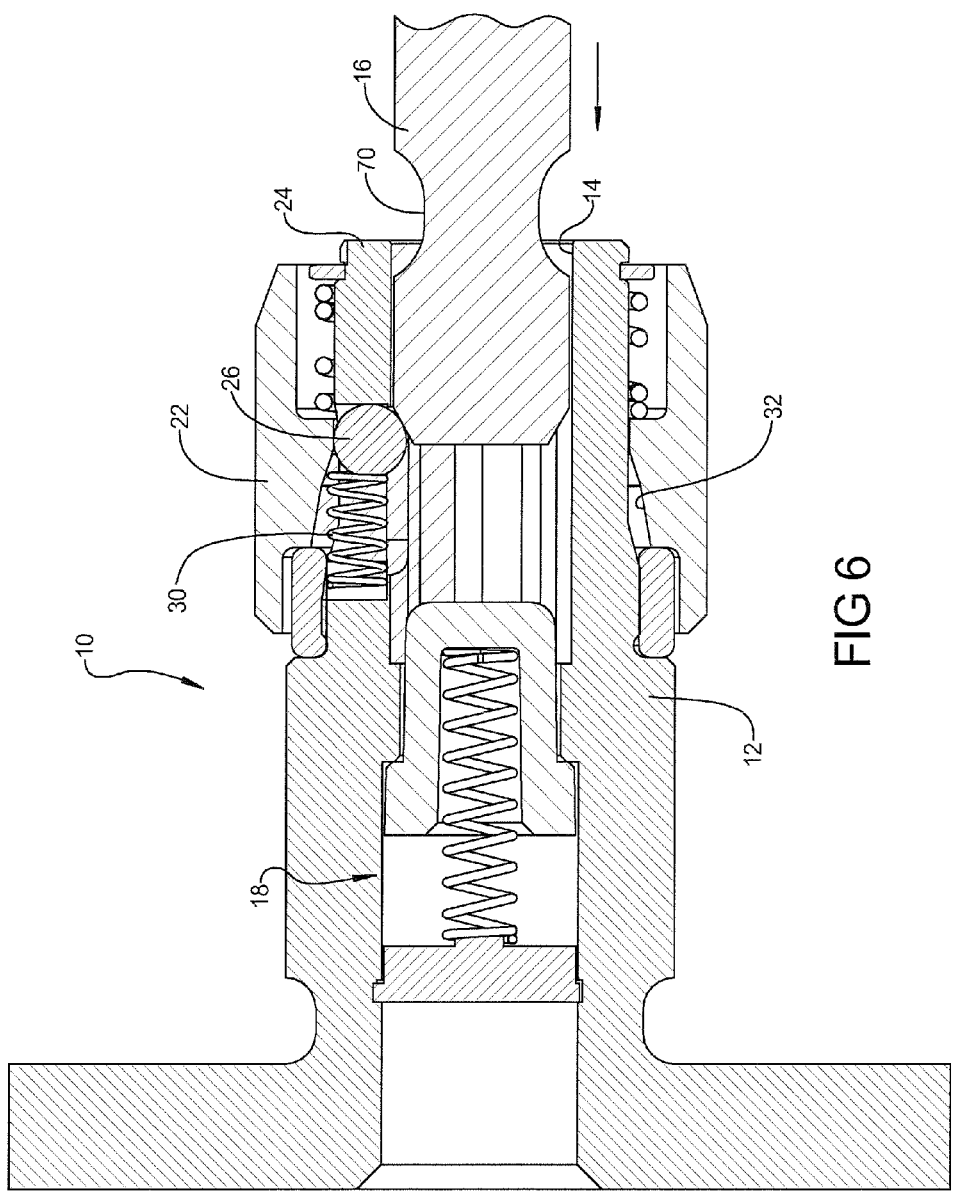
FIG. 6 is a cross-sectional view of the bit holder device with a tool bit being inserted into the bit holder according to the principles of the present disclosure.
Figure 7:
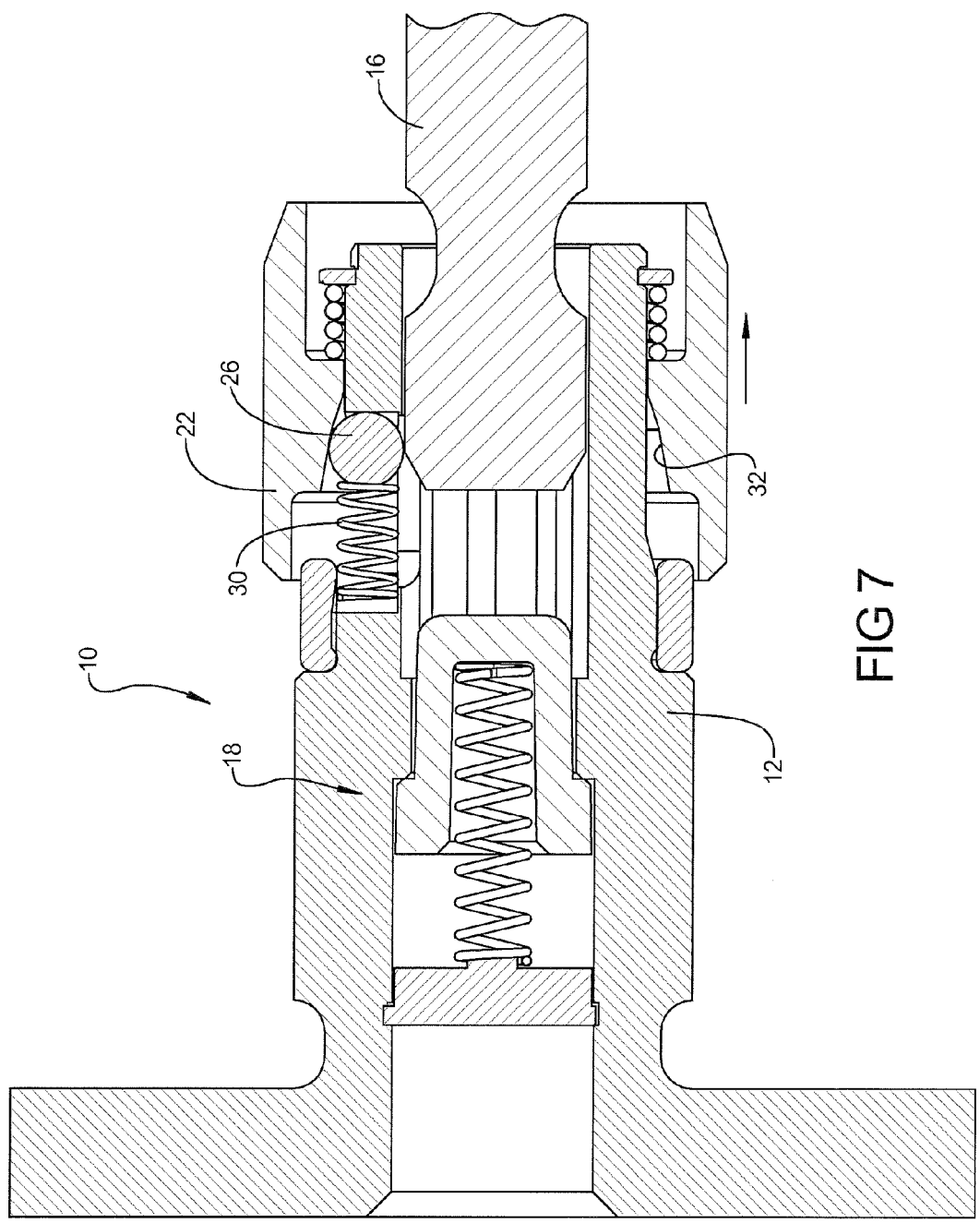
FIG. 7 is a cross-sectional view of the bit holder device with the tool bit being pressed into the bit retention device so that the ball is slid rearward along the ramp portion of the actuator sleeve.
Figure 8:
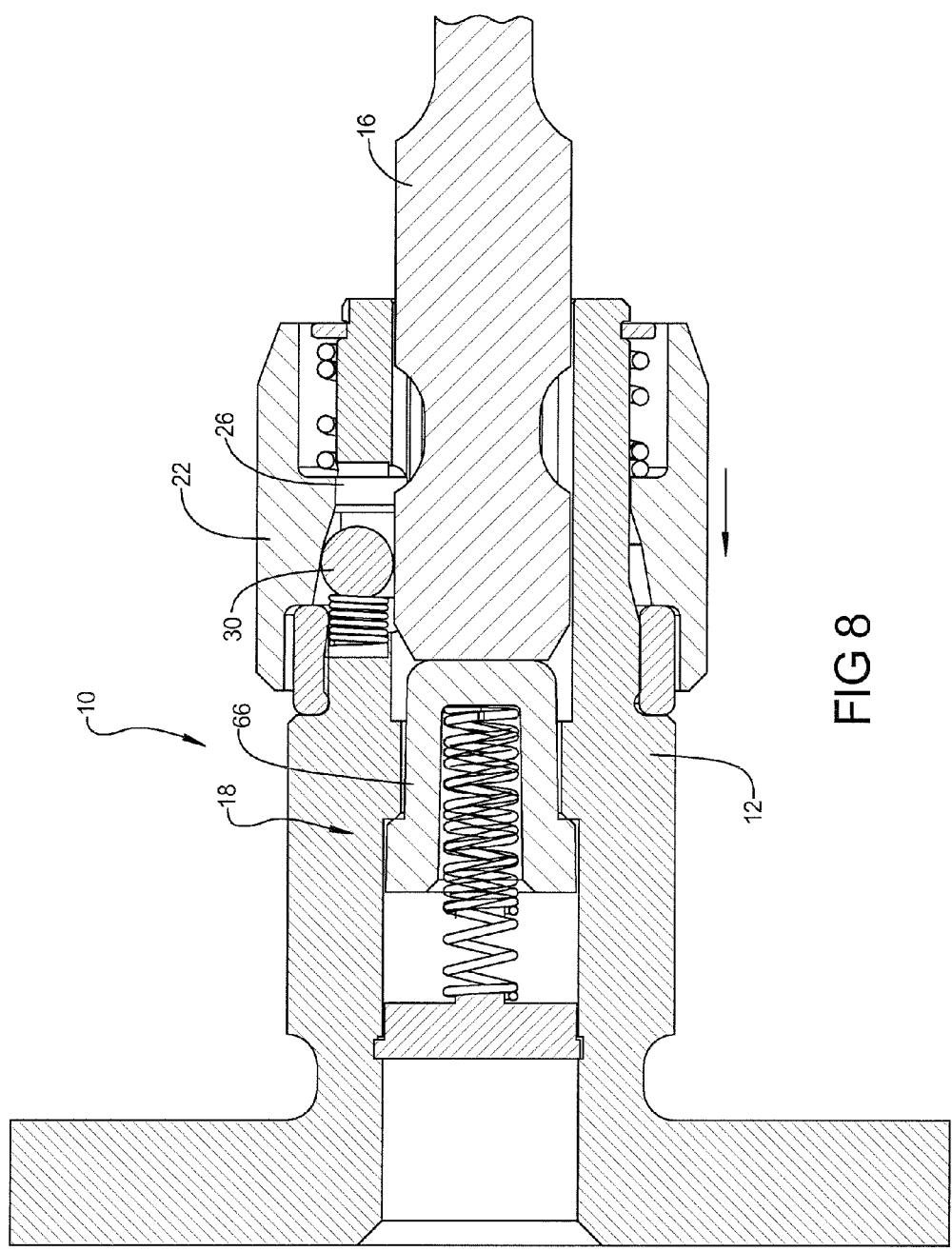
FIG. 8 is a cross-sectional view of the bit retention device with the bit inserted further within the hexagonal cavity prior to the ball being received in the ball groove of the screwdriver bit.

In order to insert a bit into the bit retention device, the bit is inserted into the polygonal cavity 14, as illustrated in FIG. 6, until the end of the bit 16 engages the ball 26, as shown in FIG. 6. The bit 16 is then pressed further inward so that the ball 26 presses against the spring 30 and moves rearward in the ball groove 28 and upward along the ramp 32 of the actuator sleeve 22. Once the ball 26 moves far enough along the ramp 32, the ball 26 rides along a vertex of the hexagonal surface of the bit 16. The bit 16 then presses against the plunger 66 and presses the plunger 66 rearward as illustrated in FIG. 8. The bit 16 is then pressed further inwards to its fully locked position as illustrated in FIG. 1.

Figure 9:
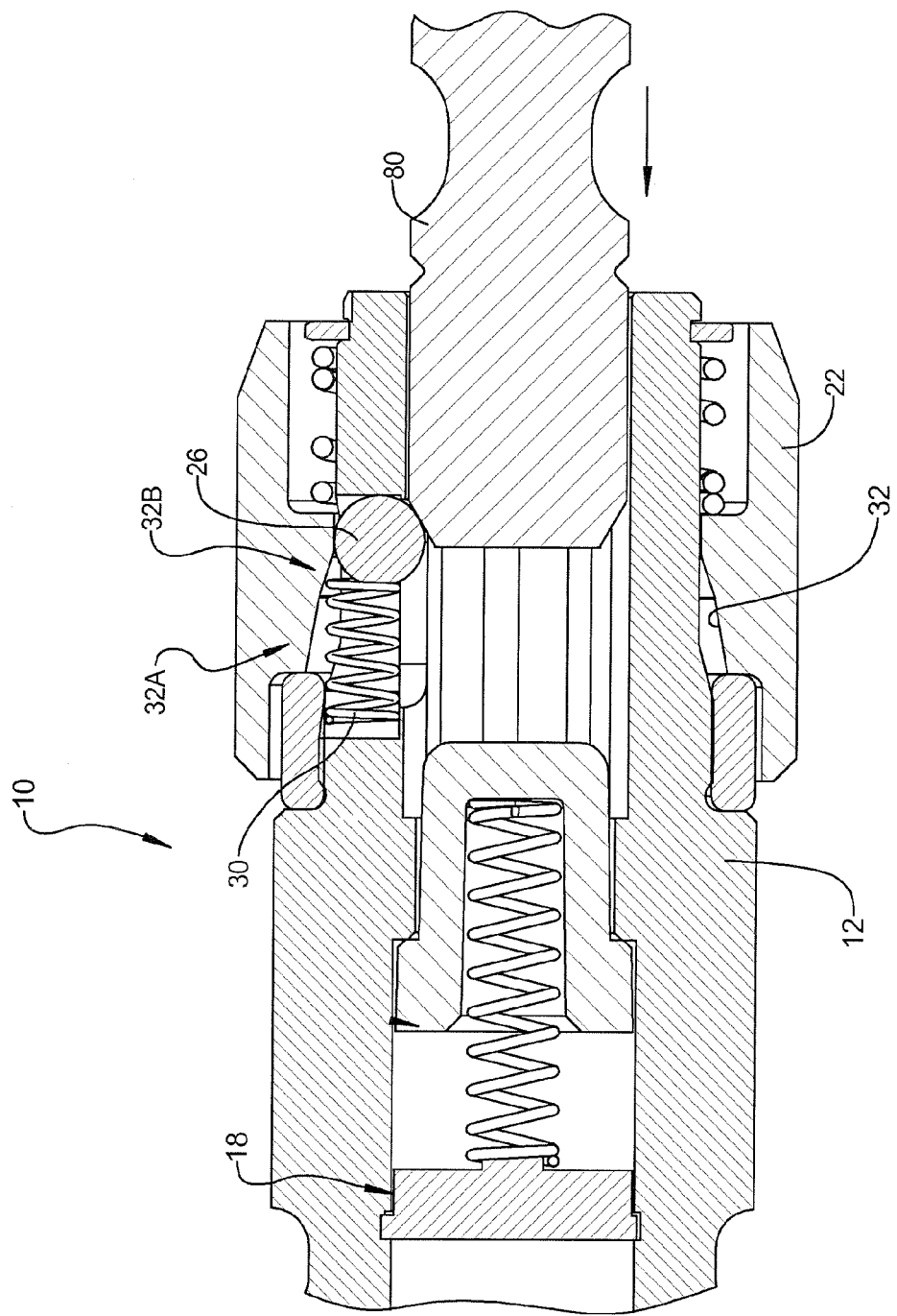
FIG. 9 illustrates a cross-sectional view of the bit retention device having a "bit tip"-type bit being inserted therein according to the principles of the present disclosure.
Figure 10:
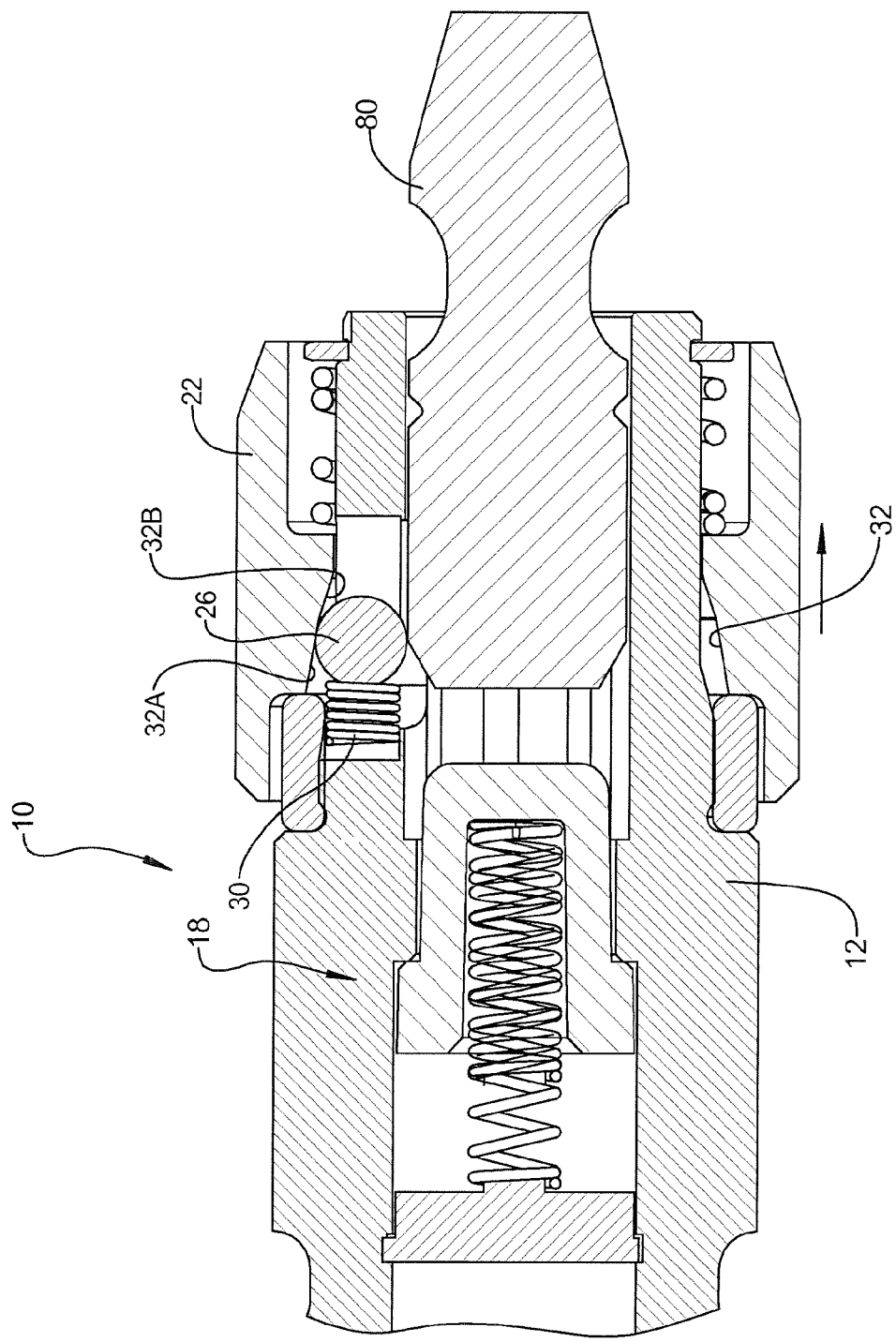
FIG. 10 illustrates the "bit tip"-type being further inserted into the bit retention device with the ball being pushed rearward along the ramp on the interior surface of the actuator sleeve.
Figure 11:
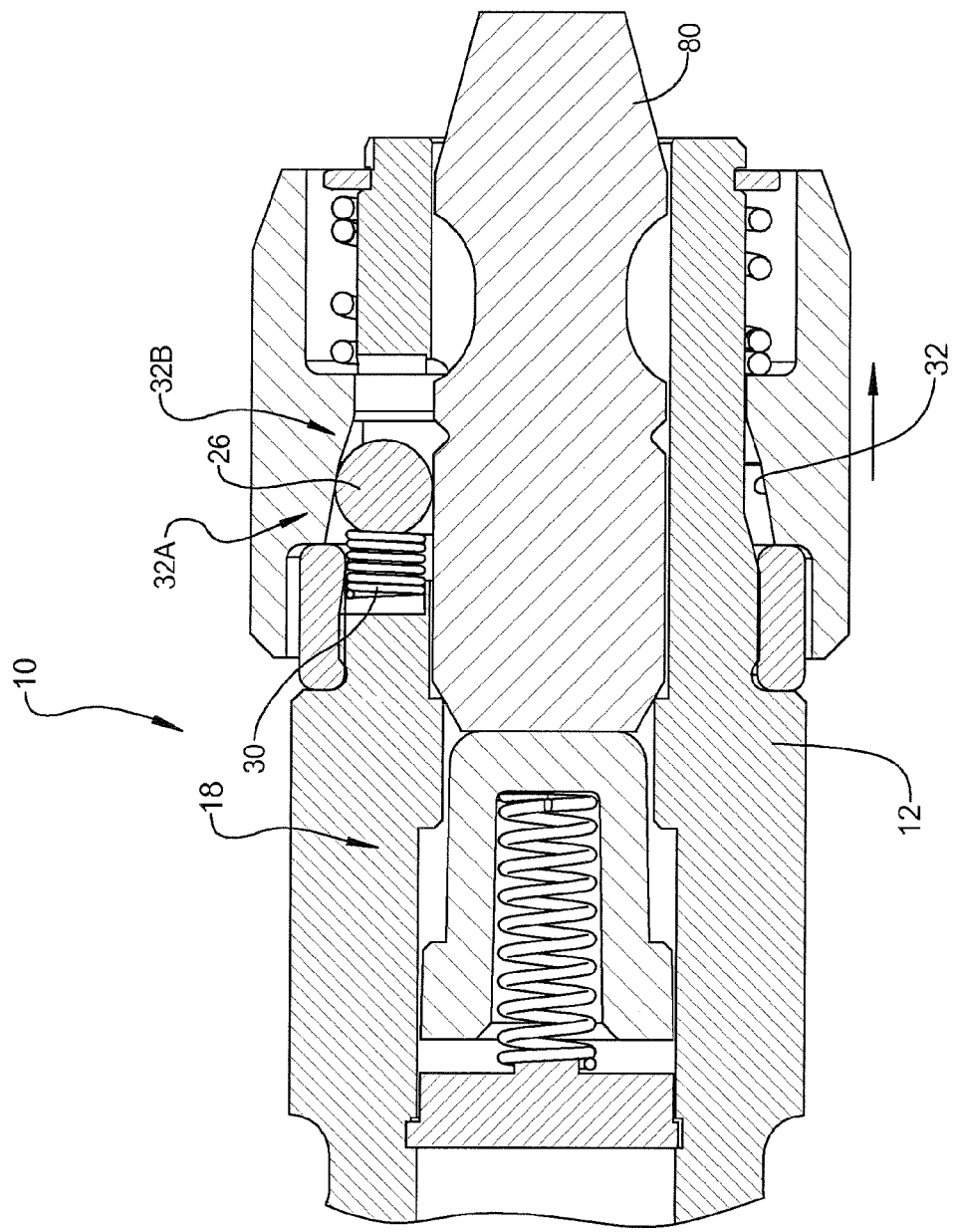
FIG. 11 is a cross-sectional view showing the engagement of a "bit tip"-type screwdriver bit fully inserted into the bit retention device according to the principles of the present disclosure.

Another type of bit is often referred to as a "bit tip" as illustrated by references numeral 80 in FIGS. 9-11. For installation of a bit tip 80 in the bit retention device 10, the bit tip 80 is inserted into the polygonal cavity 14 as illustrated in FIG. 9. As the bit tip 80 engages the ball 26, the ball is pressed rearward, compressing the ball spring 30 and the ball is caused to move relative to the ramp 32 so that the ball 26 can move radially outward as it traverses the ramp 32, as illustrated in FIG. 10. As the ball 26 moves radially outward to a sufficient extent, the bit tip 80 is then able to move freely inward against the biasing force of the plunger assembly 18. The bit tip 80 is then pressed inward to its full extent as illustrated in FIG. 11.

In the fully inserted position, the ball 26 is biased against the shallow ramp portion 32A of the ramp 32 of the actuator sleeve 22. The smaller angle of inclination α of the shallow ramp portion 32A provides a radial force against the ball 26 that is sufficient for retaining the bit tip 80 within the bit retention device 10 without the ball 26 having to engage any recess on the bit tip 80.

In order to release the bit tip 80 from the bit retention device 10, the actuator sleeve 22 is pulled in a forward direction and the plunger 18 biases the bit tip forward a sufficient amount for the bit tip 80 to be removed by the user. The use of a ramp 32 having a shallow ramp portion 32A and a steep ramp portion 32B allows the bit retention device 10 to be utilized with various kinds of tool bits wherein the ball 26 is able to be received in an annular groove of a "power bit"-type bit with ramp portion 32B causing the ball 26 to move radially inward to a greater extent than the shallow ramp portion 32A so that the ball is properly received within the ball groove 70 of the power bit. The greater angle of inclination of the steep ramp portion 32B allows the ramp 32 to be shorter and therefore the actuator sleeve 22 can be more compact. The shallow ramp portion 32A provides a sufficient radial inward force to retain a "bit tip"-type bit within the bit retention device 10 without the ball 26 needing to engage a recess on the bit.

The spring biased ball 26 allows a user to insert a bit 16 into the bit retention device 10 without having to use a second hand to simultaneously engage the actuator sleeve 22. Instead, the user can hold the tool with one hand and insert the bit 16, 80 into the bit retention device with the other hand. In order to release the bit 16, 80 from the bit retention device 10, the actuator sleeve 22 can then be pulled forward and the plunger assembly 18 presses the bit 16, 80 forward a sufficient amount so that the sleeve 22 can be released and the bit 16, 80 can be grasped by the same hand and removed from the bit retention device 10, thus making it a one-hand operation to remove the bit 16. The plunger spring 68 can be provided with a sufficient spring force to cause the bit 16, 80 to be moved forward upon activation of the actuator sleeve 22, but not too strong to eject the bit 16, 80 from the bit retention device.

Figure 12:
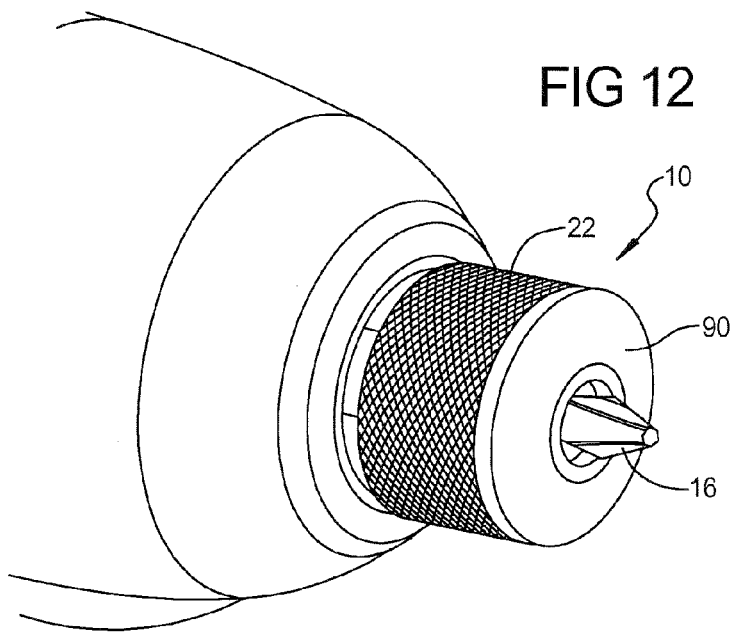
FIG. 12 is a perspective view of a nose magnet applied to the bit retention device according to the principles of the present disclosure.
Figure 13:
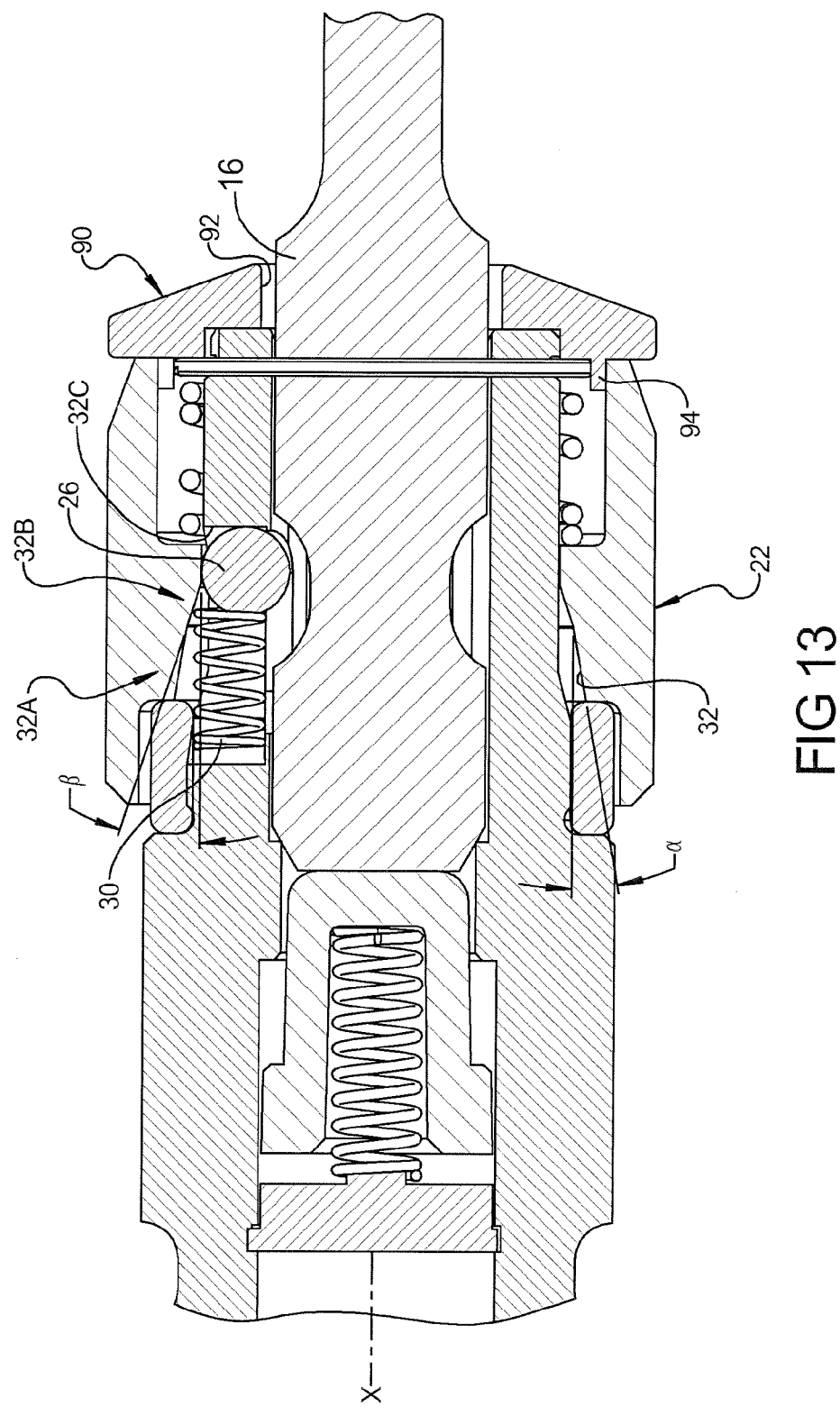
FIG. 13 is a cross-sectional view of the nose magnet applied to a bit retention device according to the principles of the present disclosure.

As shown in FIGS. 12-13, a nose magnet 90 can have an annular shape with a central aperture 92 magnet 90 has concentric ribs 94 that conform to the front of the shaft 12 and sleeve 22 to locate the magnet 90 and hold it concentric to the bit retention device 10. The magnet holds to the shaft in sleeve and holds a fastener in engagement with the bit 16 because the nose magnet 90 is external to the bit retention device 10, it does not attract metal debris inside the bit retaining device 10. Furthermore, the magnet 90 can be adhered to the actuator sleeve or otherwise connected thereto so that the magnet does not become dislodged from the bit retention device 10. Alternatively, the nose magnet 90 can be removably attached under its magnetic traction to the actuator sleeve 22 so that it can be easily removed and reinserted by the user, as desired.

Figure 14:
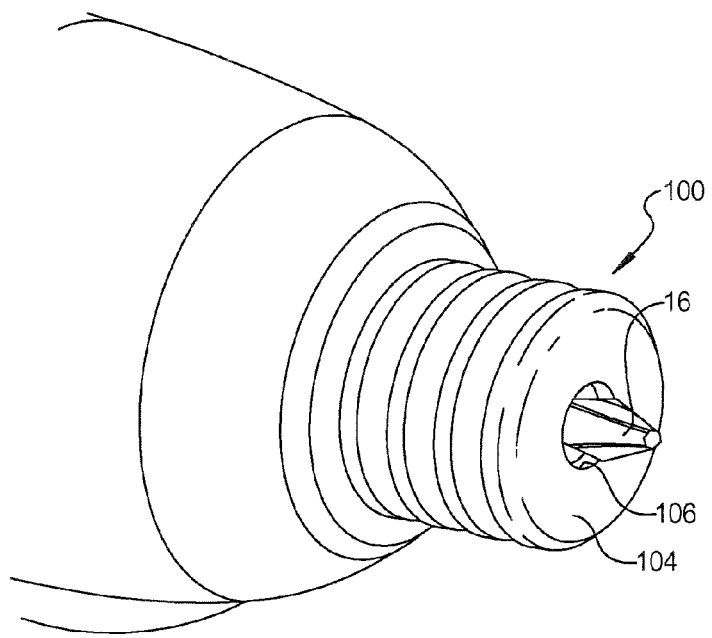
FIG. 14 is a perspective view of a non-marring nose cover applied to the bit retention device of the present disclosure.
Figure 15:
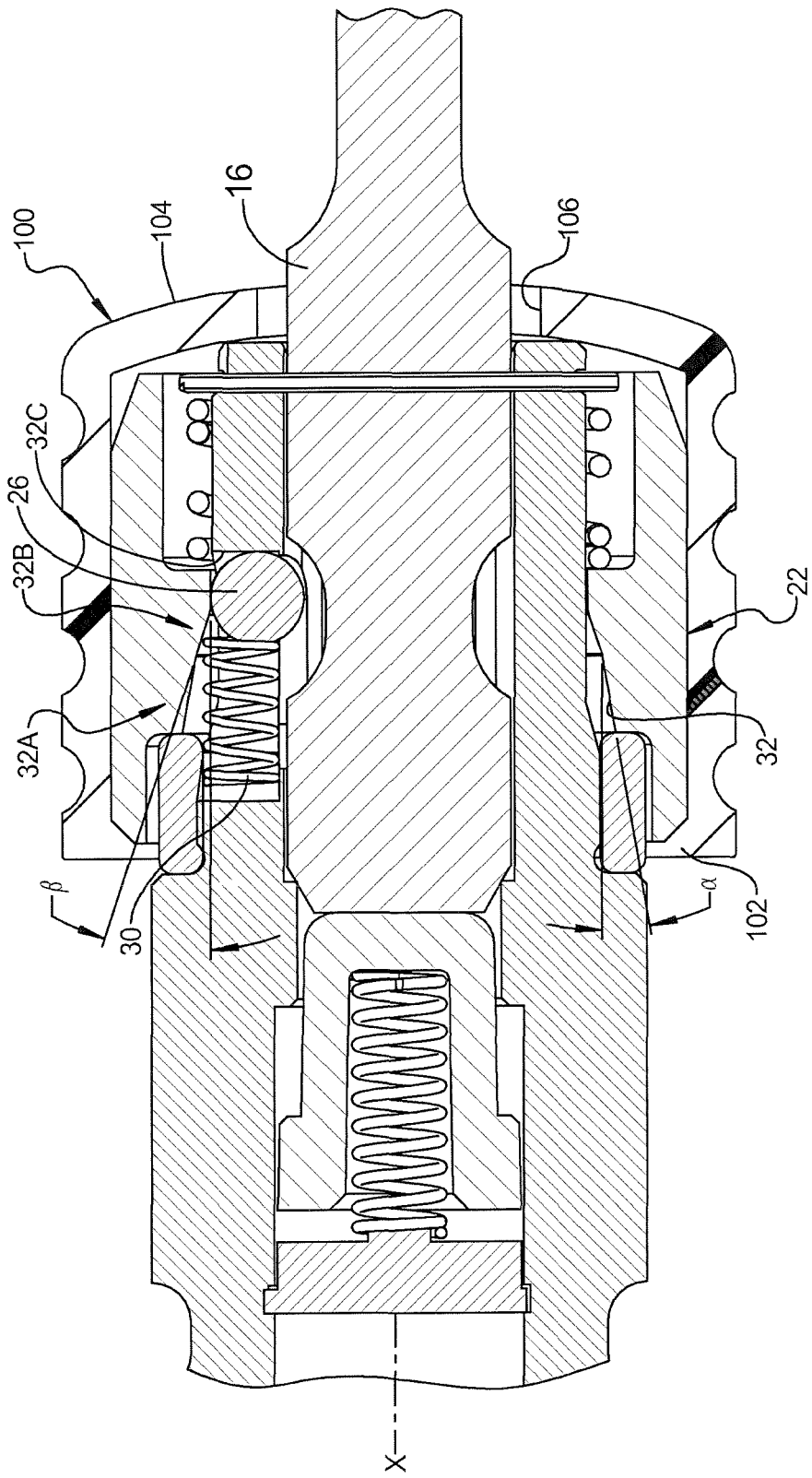
FIG. 15 is a partial cross-sectional view of the non-marring nose cover applied to a bit retention device according to the principles of the present disclosure.

With reference to FIGS. 14-15, a non-marring nose cover 100 can be disposed over the bit retention device 10. The non-marring nose cover 100 can be made of a plastic or elastomeric material and can be formed such that it can be slipped over the actuator sleeve 22 and retains itself in place with a slight interference or wrap around portion 102 that wraps around the proximal end of the actuator sleeve 22. The nose cover 100 can further include a distal end portion that wraps over the end portion of the bit retention device 10 with a central aperture 106 for receiving a bit 16 therein. The non-marring nose cover 100 prevents the knurled metal sleeve 22 from marring a work material. The forward portion 104 reduces or eliminates infiltration of dust and debris into the bit retention device allowing it to operate more smoothly for a longer period of time. The aperture 106 in the forward portion 104 can fit snugly around the bit 16.

Figure 16:
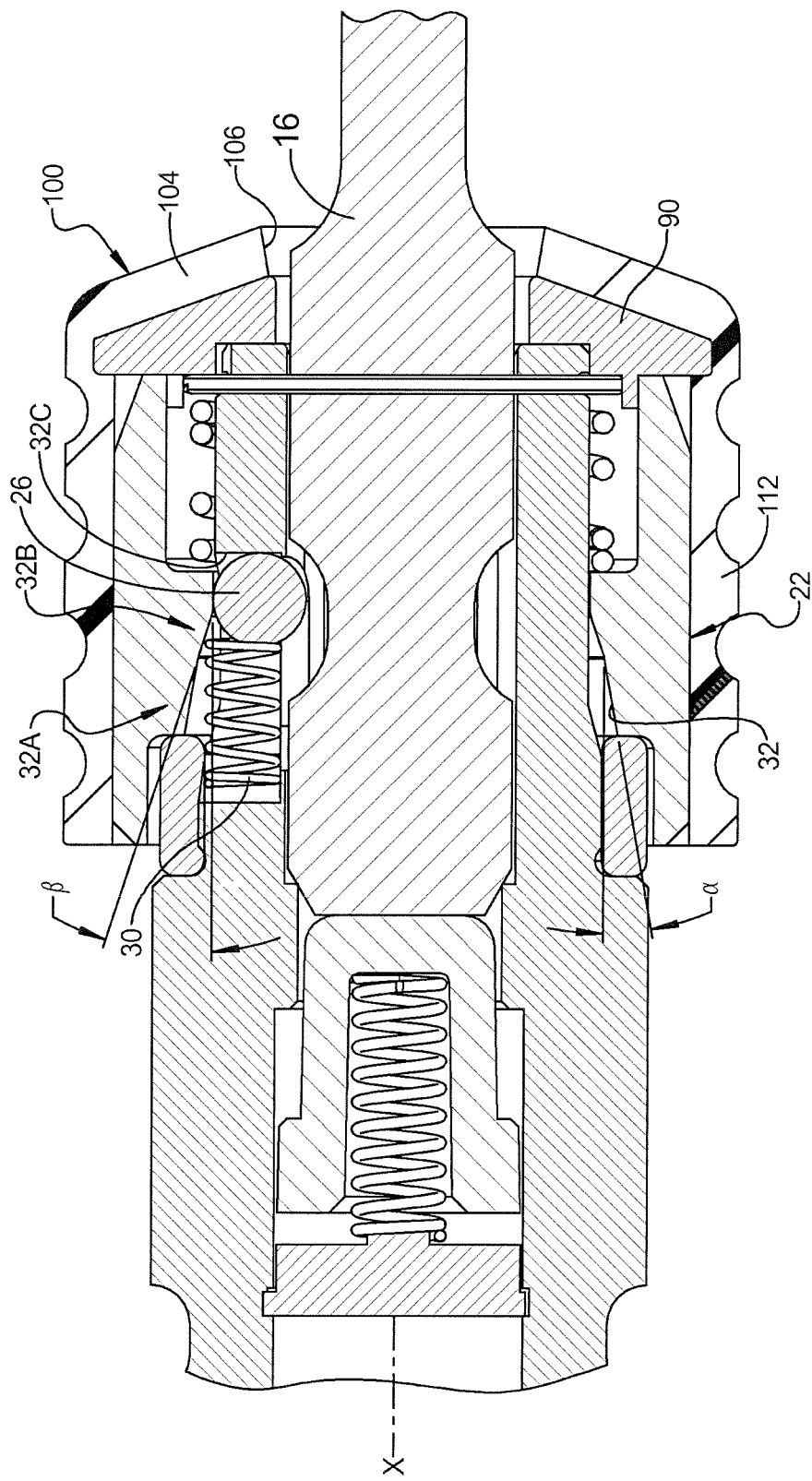
FIG. 16 is a cross-sectional view of a combined nose magnet and nose cover assembly according to the principles of the present disclosure.

As shown in FIG. 16, the bit retention device 10 can further be provided with an over-molded magnetic nose cover 110. The over-molded magnetic nose cover 110 can include a nose magnet 90 constructed generally as described above. A plastic cover 112 can be over-molded on the nose magnet 90 or alternatively, the nose magnet 90 can be inserted into the cover 112. The cover 112 can be made of plastic or elastomer and is designed to prevent the knurled metal sleeve 22 from marring the work material. A slight interference between the cover 112 and the sleeve 22 may retain the cover onto the shaft or, alternatively, a wrap around portion or adhesives can be utilized for securing the cover 112 onto the actuator sleeve 22. In assembled condition as illustrated in FIG. 16, the nose magnet 90 will attract a fastener to the bit 16 hold the fastener in place. Furthermore, the cover portion 112 protects the work piece from being marred while a fastener is being inserted. It should be noted that the magnet 90 may also retain the cover onto the shaft to provide a cover 112 and magnet 90 that can be easily removed as desired by the user.

Figure 17:
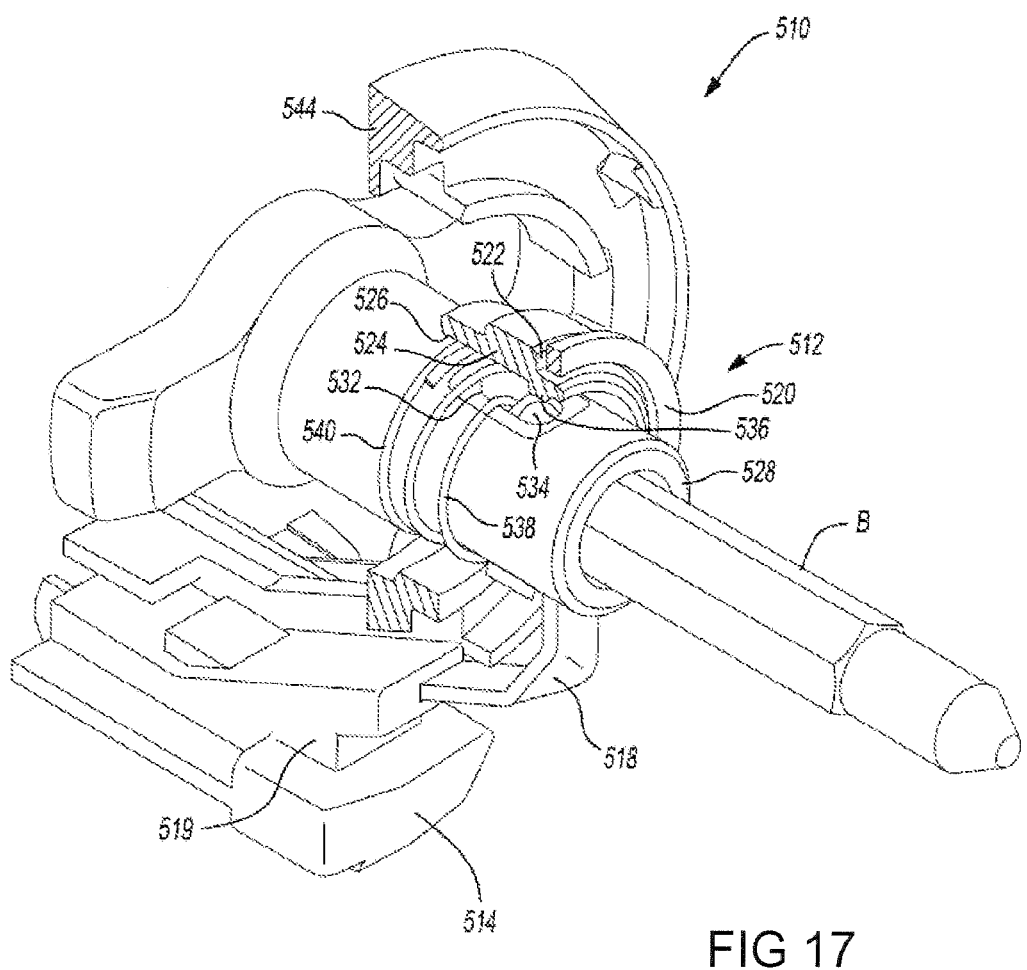
FIG. 17 is a perspective view of the bit retention mechanism employing a ball with the forward bearing removed for illustrative purposes.
Figure 18:
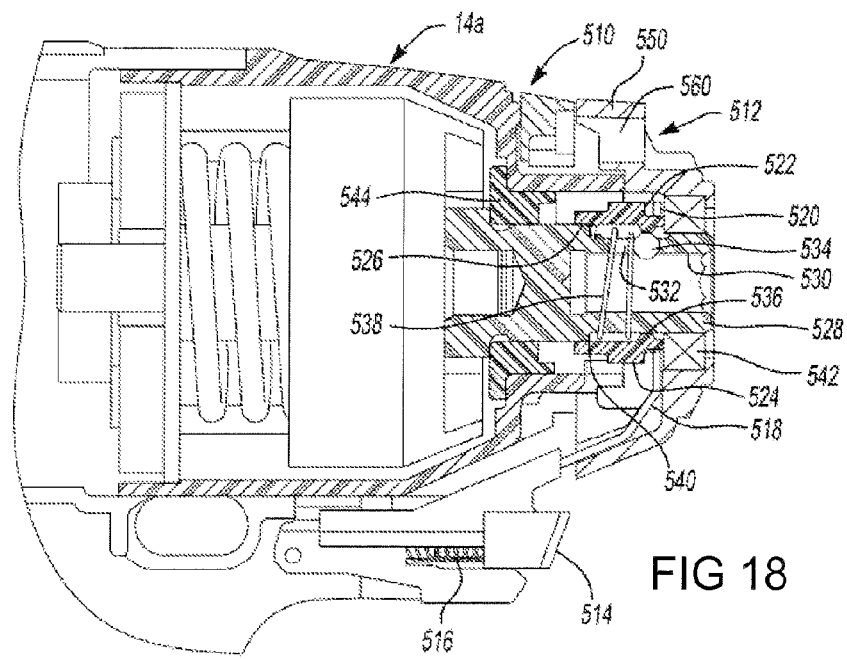
FIG. 18 is a detailed partial cross-sectional view of the power tool of FIG. 17 shown in a disengaged position.
Figure 19:
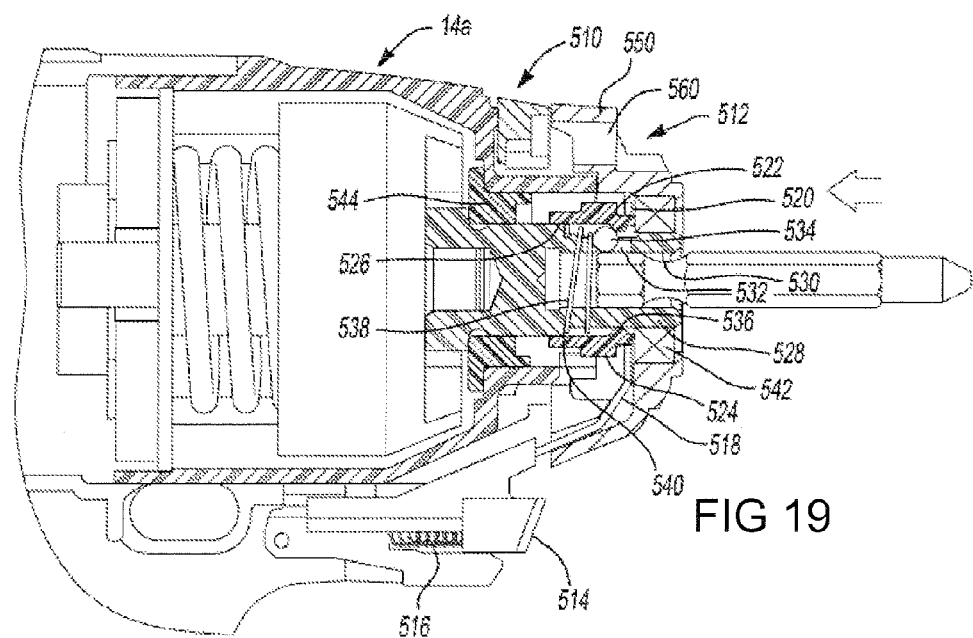
FIG. 19 is a detailed partial cross-sectional view of the power tool of FIG. 17 illustrating a bit being inserted therein.
Figure 20:
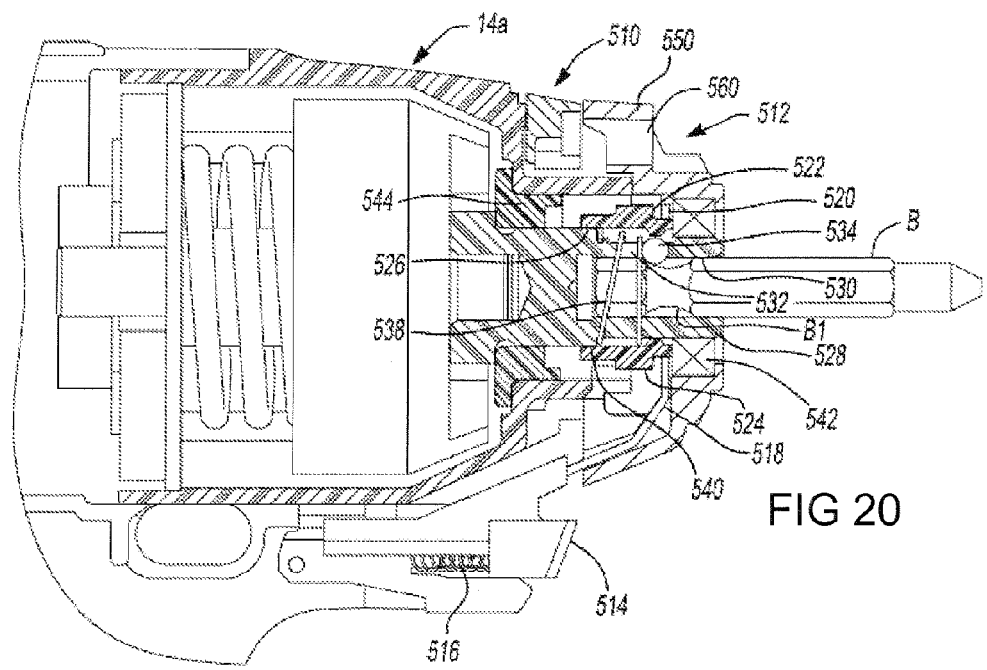
FIG. 20 is a detailed partial cross-sectional view of the power tool of FIG. 17 illustrating a bit fully inserted therein.
Figure 21:
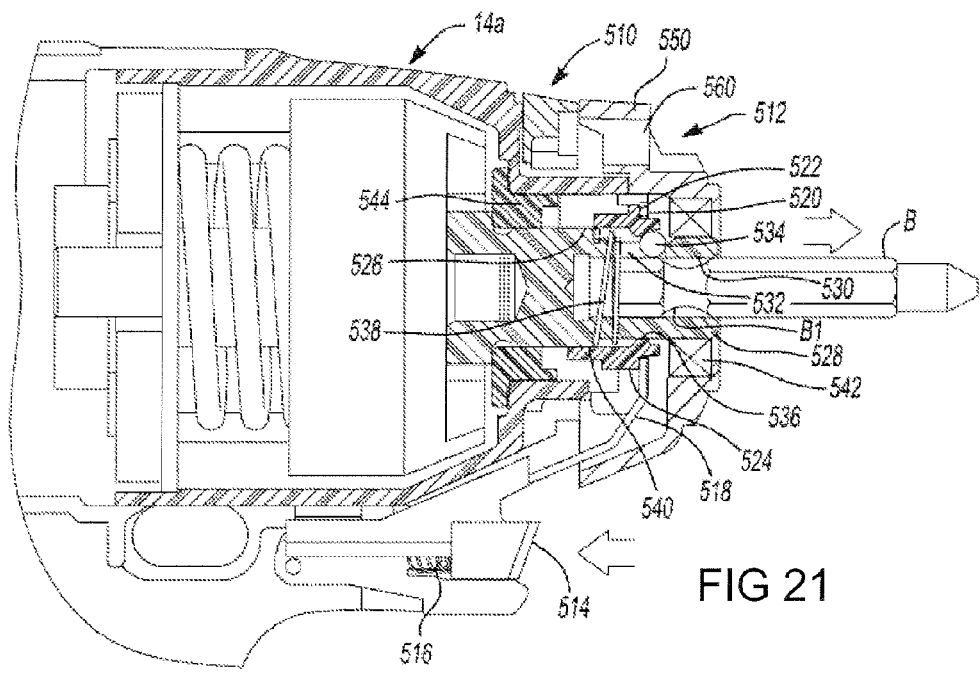
FIG. 21 is a detailed partial cross-sectional view of the power tool of FIG. 17 illustrating a bit being released therefrom.
Figure 22:
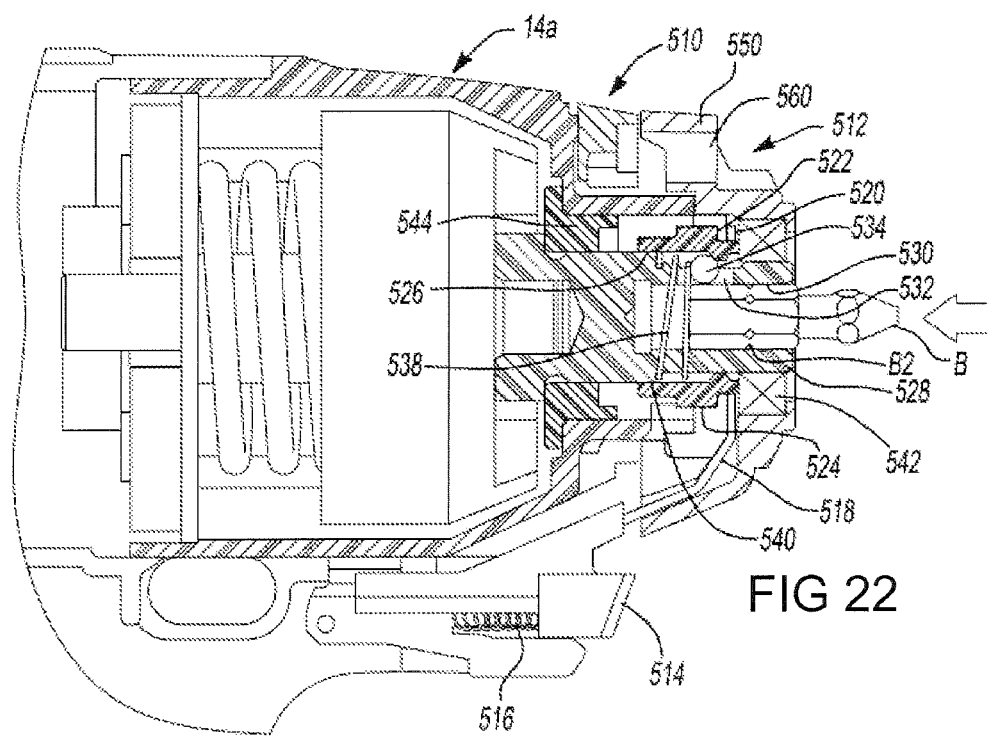
FIG. 22 is a detailed partial cross-sectional view of the power tool of FIG. 17 illustrating a 1" bit being inserted therein.
Figure 23:
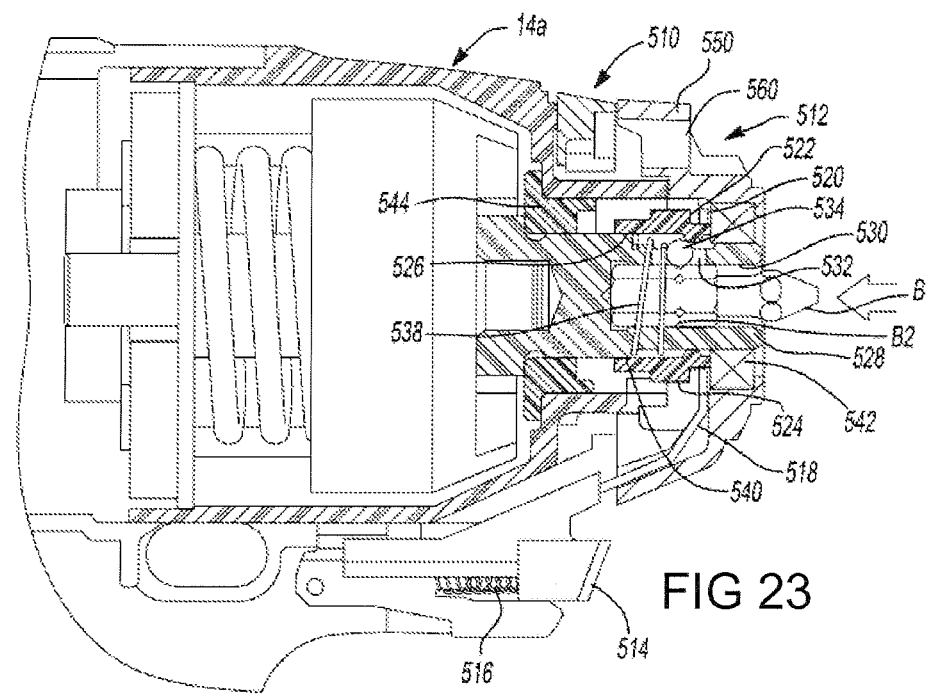
FIG. 23 is a detailed partial cross-sectional view of the power tool of FIG. 17 illustrating a 1" bit fully inserted therein.
Figure 24:
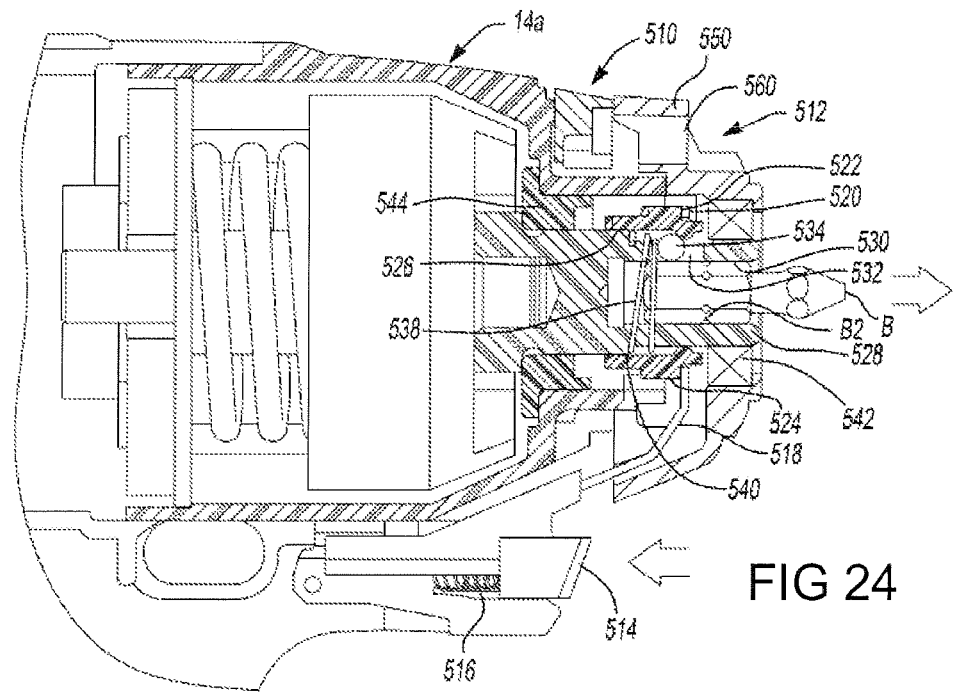
FIG. 24 is a detailed partial cross-sectional view of the power tool of FIG. 17 illustrating a 1" bit being released therefrom.

With reference to FIGS. 17-24, a further embodiment of a power tool 510 having an integrated bit retention mechanism 512 will now be described. According to the embodiment as shown in FIG. 17, an actuator button 514 is disposed in a position forward of the trigger 18 and is pulled in a generally axial direction to release a bit B from the bit retention mechanism 512. With reference to FIG. 51, the actuator button 514 is disposed against a return spring 516 which biases the actuator button 514 in a forward direction. The actuator button 514 is connected to a shift fork or member 518 which is slidably received in a portion of the housing 14 of a power tool. It should be appreciated that shift member 518 can comprise any mechanical interconnection system, including linkages, gearing, or other mechanical actuators. The shift member 518 includes an arm portion 519 connected to the actuator button 514. The shift member 518 includes a pair of forward arms or enclosed ring 520 which are/is received against a radially extending flange 522 of a sleeve member 524.

The sleeve member 524 has a central aperture 526 for being slidably received on a spindle 528. The spindle 528 includes a polygonal cavity 530 adapted for receiving a tool bit B therein. The spindle 528 also includes a ball slot 532 that communicates with the polygonal cavity 530. A ball 534 is received in the ball slot 532 of the spindle 528 and is movable along the ball slot 532 to engage and disengage a bit received within the polygonal cavity 530. The ball 534 engages and remains engaged against a stop member 536 extending from an inner surface of the central aperture 526 of sleeve member 524. In this way, stop member 536 can cooperate, as will be described, with other members to engage ball 534 with a retaining feature formed on bit B. However, during insertion and commanded release, ball 534 is permitted to move to a position adjacent stop member 536 to permit disengagement of ball 534 from the retaining feature formed on bit B.

A compression spring 538 is disposed against the ball 534 at a forward end of the spring and against a shoulder portion 540 of the spindle 528 at a rearward position, such that ball 534 is generally aligned with and engaging stop member 536. The shift member 518 is operable in response to actuation of the actuator button 514 to slide the sleeve member 524 in a rearward direction. In the case of a longer bit B having a ball groove B1, the rearward or aft translation of sleeve member 524 and stop member 536 permits ball 534 to move radially outward to a position forward of stop member 536 (see FIG. 21) for disengaging the bit B received in the polygonal cavity 530. However, in the case of a shorter bit B having a ball chamfer B2 that does not permit ball 534 to ride between stop member 536 and ball chamfer B2 (see FIG. 24), the rearward or aft translation of sleeve member 524 and stop member 536 causes ball 534 to be moved aft to a disengaged position with ball chamfer B2 for disengaging the bit B received in the polygonal cavity 530.

When the actuator button 514 is released, the return spring 516 biases the actuator button 514 to its forward position along with the shift member 518 thereby allowing the sleeve member 524 to move to its forward position. The stop member 536, having ramping surfaces 537, is then translated into a position radially adjacent ball 534, thereby urging ball 534 radially inward to polygonal cavity 530 (and into engagement with bit B, if present). Additionally, to some extent, compression spring 538 biases ball 534 forward against ramping surface 537 of stop member 536 causing ball 534 to translate along the ramping surface in a radially inward direction.

The insertion of a bit B into the bit retention mechanism 512 is again by "drop-in-to-load" insertion wherein the bit B pushes the ball 534 rearward against the biasing force of compression spring 538 to at least a position aft of stop member 536 (see FIGS. 19 and 22), thereby permitting ball 534 to move radially outward along the ball slot 532 until the bit B can be fully inserted. Once bit B is inserted a sufficient distance, ball 534, under the forward biasing force of compression spring 538, is caused to engage ball groove B1 or ball chamfer B2 of bit B (see FIGS. 20 and 23, respectively).

With reference to FIGS. 18-24, the spindle 528 is supported at a forward end by a forward bearing 542 and at a rearward end by a rearward bearing 544. The entire bit retention mechanism 512 can be disposed axially between the forward end of the forward bearing set 542 and the forward end of the rearward bearing set 544. The bit retention mechanism 512 can also be completely disposed within the housing 14 wherein the nose cover 550 defines a portion of the housing 14.

A fixed nose cover 550 is supported over a forward end of the forward housing portion 14a and conceals the shift member 518.

Figure 25:
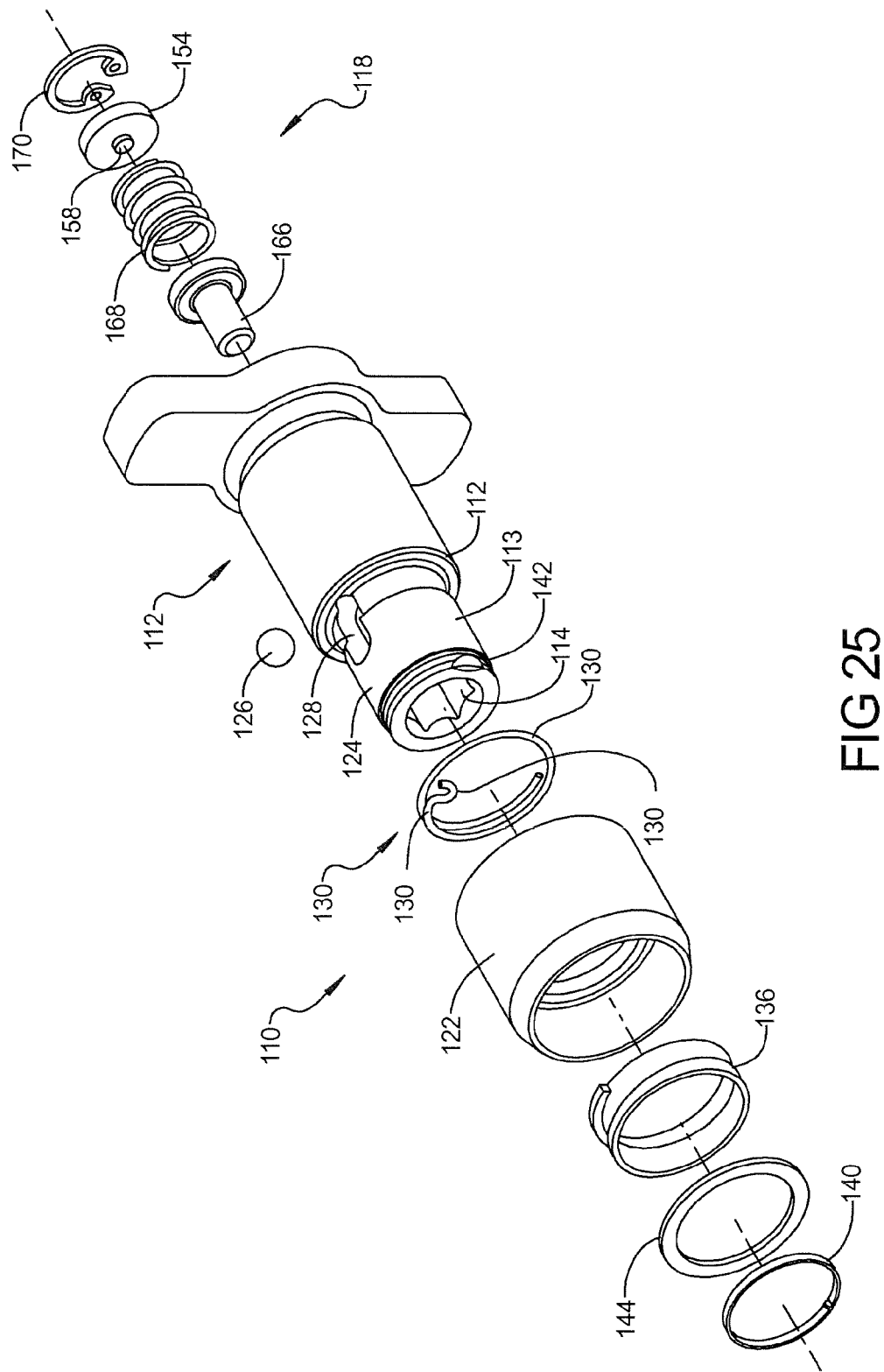
FIG. 25 is an exploded perspective view of a further bit retention device according to the principles of the present disclosure.
Figure 26:
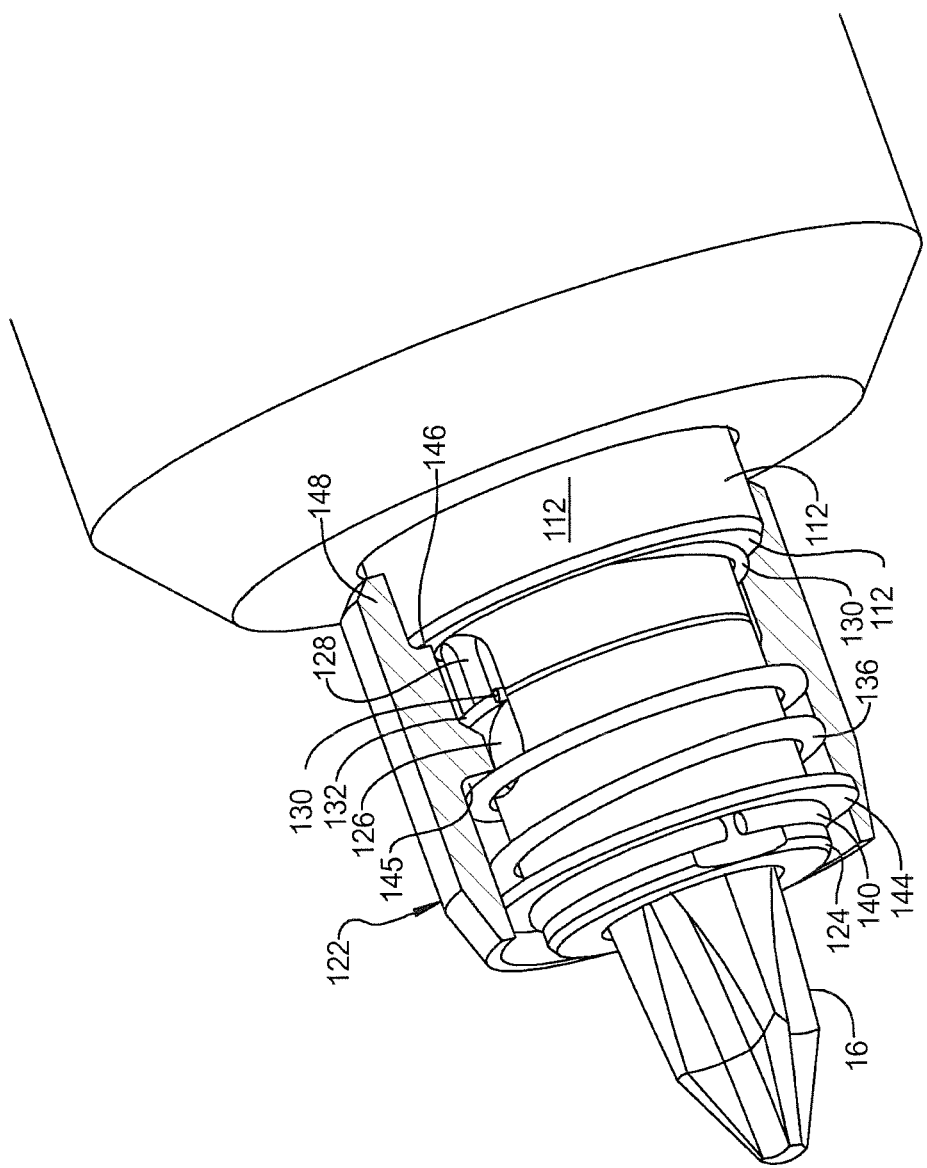
FIG. 26 is an assembled partial cut-away perspective view of the bit retention device shown in FIG. 25.

With reference to FIGS. 25-27, a bit retention device 110, according to a further embodiment of the present disclosure, will now be described. The bit retention device 110 includes a shaft 112 having a sidewall 113 defining a polygonal cavity 114 for receiving a tool bit or the like 16. The polygonal cavity 114 can be hexagonal. A plunger sub-assembly 118 is received in a bore extending from the polygonal cavity 114 within the shaft 112. An actuator sleeve 122 is disposed around a first end 124 of the shaft 112 and engages a retainer 126 that is received in a groove opening 128 of the sidewall 113 of the shaft 112. A retainer spring 130 substantially surrounds the shaft 112 and biases the retainer 126 in a forward direction (best shown in FIG. 26). The retainer spring 130 can be a helical compression spring having a helix portion 130a and ending at a bend portion 130c that transitions to an inwardly projecting portion 130b that is received at least partially in the groove opening 128 (best shown in FIGS. 26 and 27) to bias the retainer 126 in a forward direction toward the front end 124 of the shaft 112. The inwardly projecting portion 130b defines a retainer engaging portion that can have a shape complementary to the shape of the retainer element 126. The retainer 126 can be in the form of a ball, as shown, or can have other forms such as a cylindrical roller or a pin. The shape of the inwardly projecting portion 130b can be curvilinear, including U-shaped, V-shaped, or otherwise formed to fit into the groove opening 128 and engage the retainer 126. A rearward portion of the retainer spring 130 can be disposed against a forward facing shoulder 112a of the shaft 112. The shoulder 112a can be integrally formed with the shaft 112 or separately formed from a member received on the shaft 112.

An actuator spring 136 biases the actuator sleeve 122 in a rearward direction relative to the first end 124 of the shaft 112. A retainer clip 140 is received in a recessed groove 142 in the first end 124 of the shaft 112 for supporting a washer 144 against a forward end of the actuator spring 136. A second end of the actuator spring 136 is received against an interior shoulder portion 145 (best shown in FIG. 26) of the actuator sleeve 122 in order to bias the actuator sleeve 122 in a rearward direction relative to the first end 124 of the shaft 112. The actuator sleeve 122 includes a rear shoulder portion 146 (best shown in FIG. 26) that can be located adjacent to the forward facing shoulder 112a of the shaft 112 to limit rearward movement of the actuator sleeve 122. The actuator sleeve 122 can include a rearwardly extending cylindrical guide portion 148 that engages an outer surface 112b of the shaft 112 rearward of the shoulder 112a for sliding engagement therewith.

The plunger sub-assembly 118 can include a spring seat 154 that is adapted to be inserted within a rear portion of the bore of the shaft 112. The spring seat 154 can include a center post 158 which is adapted to receive a plunger spring 168 thereon. A plunger member 166 is disposed against a forward end of the plunger spring 168. The spring seat 154 can be retained in the bore by an internal retention ring 170 received in an internal groove within the bore.

The plunger member 166 can have a recessed cavity for receiving the plunger spring 168. The plunger sub-assembly 118 is inserted into the rear end of the bore in the shaft 112 so that the forward end of the spring 168 engages the plunger member 166. The spring seat 154 and retention ring 170 are inserted into the bore until the retention ring 170 engages the internal groove within the bore. The plunger member 166 is designed to slide freely within the bore while the spring 168 biases the plunger member 166 toward the first end 124 of shaft 112.

The ramp 132 (FIG. 26) of the actuator sleeve 122 can optionally include a shallow ramp portion 32A and a steep ramp portion 32B, as discussed above with reference to the embodiment disclosed in FIG. 4 and is therefore not described in further detail herein.

During assembly, the retainer spring 130 is slid over the shaft 112 so that it engages the shoulder 112a and the retainer, such as a ball 126, is inserted into the groove opening 128 so that the inwardly projecting portion 130b of the retainer spring is received in the groove opening 128 and engages the ball or other retainer 126 to bias the ball in a forward direction. The actuator sleeve 122 is then inserted onto the end of the shaft 112 and the actuator spring 136 is slid over the end of the shaft 112 inside of the actuator sleeve 122 so that the actuator spring 136 abuts against the shoulder portion 145 of the actuator sleeve 122. The retaining clip 140 and washer 144 are then installed on the shaft 112 so that the retainer clip 140 is received in the recessed groove 142 at the first end 124 of the shaft 112 and the washer 144 engages the front end of the actuator spring 136.

It should be noted that the shaft 112 can be designed to be permanently installed on a rotating shaft of a power tool or can alternatively be designed to be removably engaged from a power tool or a hand tool. The bit retention device 110 can be utilized for retaining various types of hexagonal or other polygonal shaped bits such as screwdriver bits and drill bits.

A common form of bit includes a hexagonal shank portion having an annular radiused groove or a small notch therein that is designed to receive a ball or other retaining member of a retention device. When the bit retention device 110 of the present disclosure is utilized for retaining a bit, the ball 126 is received in an annular groove, the small notch, another recess, or against the surface of the bit 16. For example, when used with a bit 16 having an annular groove 70, the ramp portion 132 retains the ball within the annular groove 70. In order to release the bit 16 from the retention device 110, the actuator sleeve 122 is pulled in a forward direction so that the ball or other retainer element 126 is able to move radially outward out of the annular groove 70 and the plunger assembly 118 pushes the bit forward so that the ball groove 70 is no longer in alignment with the ball 126. The sleeve 122 can then be released and the bit 16 can be extracted with the same hand, thus making it a simple one hand operation to remove the bit 16.

In order to insert a bit into the bit retention device 110, the bit is inserted into the polygonal cavity 114, until the end of the bit 16 engages the ball 126. The bit 16 is then pressed further inward so that the ball 126 presses against the retainer spring 130 and moves rearward in the groove opening 128 and upward along the ramp 132 of the actuator sleeve 122. Once the ball 126 moves far enough along the ramp 132, the ball 126 rides along a vertex of the hexagonal surface of the bit 16. The bit 16 then presses against the plunger 166 and presses the plunger 166 rearward. The bit 16 is then pressed further inwards to its fully locked position.

In order to release the bit from the bit retention device 110, the actuator sleeve 122 is pulled in a forward direction and the plunger 118 biases the bit forward a sufficient amount for the bit to be removed by the user.

The spring biased ball or other retainer 126 allows a user to insert a bit 16 into the bit retention device 110 without having to use a second hand to simultaneously engage the actuator sleeve 122 and pull it forward. Instead, the user can hold the tool with one hand and insert the bit 16, 80 (FIGS. 1 and 9) into the bit retention device 110 with the other hand. In order to release the bit 16, 80 from the bit retention device 110, the actuator sleeve 122 can then be pulled forward and the plunger assembly 118 presses the bit 16, 80 forward a sufficient amount so that the sleeve 122 can be released and the bit 16, 80 can be grasped by the same hand and removed from the bit retention device 110, thus making it a one-hand operation to remove the bit 16. The plunger spring 168 can be provided with a sufficient spring force to cause the bit 16, 80 to be moved forward upon activation of the actuator sleeve 122, but not too strong to eject the bit 16, 80 from the bit retention device 110.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A tool bit holder, comprising:
   a shaft having a front end, a rear end, a sidewall defining a bit receiving cavity extending from the front end toward the rear end, and an opening extending through the sidewall and communicating with the bit receiving cavity;
   a bit retention device received in the opening;
   a first spring substantially surrounding the shaft and projecting at least partially into the opening to bias the bit retention device toward the front end of the shaft, the inward projecting portion having at least a partially curvilinear shape that is complementary to a shape of the bit retention device; and
   an actuator sleeve substantially surrounding the shaft and having an internal wall that engages the bit retention member, wherein the actuator sleeve is moveable between a rearward position in which the internal wall pushes the bit retention member radially inward toward the cavity to engage a tool bit that is received in the cavity, and a frontward position in which the internal wall allows the bit retention member to move radially outward from the cavity to disengage from a tool bit that is received in the cavity.

2. The tool bit holder of claim 1, wherein the first spring comprises a helical compression spring.

3. The tool bit holder of claim 2, wherein the inward projecting portion of the first spring extends radially inward of a helix defined by the helical compression spring.

4. The tool bit holder of claim 2, wherein the inward projecting portion comprises a non-helical portion of the helical compression spring.

5. The tool bit holder of claim 2, wherein the helical compression spring comprises a bend that extends radially inwardly away from a helix defined by the helical compression spring and transitions to the inward projecting portion.

6. The tool bit holder of claim 1, wherein the bit retention device comprises a detent.

7. The tool bit holder of claim 1, further comprising a second spring biasing the actuator sleeve toward the rearward position.

8. The tool bit holder of claim 1, wherein the internal wall comprises a first ramp surface that is inclined relative to the a longitudinal axis of the shaft at a first ramp angle, and a second ramp surface that is inclined relative to the longitudinal axis of the shaft at a different, second ramp angle.

9. The tool bit holder of claim 1, further comprising a power tool housing at least partially receiving the shaft, the power tool housing including a motor and a transmission coupled to the motor, wherein the transmission transmits power from the motor to the shaft.

10. A tool bit holder, comprising:
    a shaft defining a longitudinal axis and having a front end, a rear end, a sidewall defining a bit receiving cavity extending from the front end toward the rear end, and an opening extending through the sidewall and communicating with the bit receiving cavity;
    a bit retention device received in the opening;
    a first spring engaging the bit retention device and biasing the bit retention device toward the front end of the shaft;
    an actuator sleeve substantially surrounding the shaft and moveable relative to the shaft between a rear position and a front position; and
    an internal surface defined on the actuator sleeve, the internal surface having a front surface configured to engage the bit retention member when the actuator sleeve is in the rear position, a rear surface configured to engage the bit retention member when the actuator sleeve is in the front position, and an intermediate surface between the front surface and the rear surface and configured to engage the bit retention member when the actuator sleeve is between the rear position and the front position,
    wherein the front surface has a first diameter, the intermediate surface has a second diameter that is larger than the first diameter, and the rear surface has a third diameter that is larger than the second diameter, and
    wherein the intermediate surface is inclined relative to the longitudinal axis at a first angle, and the rear surface is inclined relative to the longitudinal axis at a second angle that is smaller than the first angle.

11. The tool bit holder of claim 10, further comprising an actuator spring biasing the actuator sleeve toward the rear position.

12. The tool bit holder of claim 10, wherein at least a portion of the first spring is received in the opening.

13. The tool bit holder of claim 12, further comprising a spring retainer sleeve that is received over a rearward portion of the opening to retain the portion of the first spring that is received in the opening.

14. The tool bit holder of claim 12, wherein the first spring substantially surrounds the shaft and the portion of the spring that is received in the opening comprises an inward projecting portion of the first spring having at least a partially curvilinear shape that is complementary to a shape of the bit retention device.

15. The tool bit holder of claim 10, wherein the bit retention device is operable to retain a first bit having an annular groove in a surface thereof with said bit retention device being pushed into the opening by the intermediate surface and the bit retention device is operable to retain a second bit without an annular groove in a surface thereof with the bit retention device being pushed into the opening by the rear surface.

16. The tool bit holder of claim 10, wherein the bit retention member comprises a detent.

17. The tool bit holder of claim 10, further comprising a power tool housing at least partially receiving the shaft, the power tool housing including a motor and a transmission coupled to the motor, wherein the transmission transmits power from the motor to the shaft.

18. A tool bit holder, comprising:
    a shaft having a front end, a rear end, a sidewall defining a bit receiving cavity having a longitudinal axis extending from the front end toward the rear end, and an opening extending through the sidewall and communicating with the bit receiving cavity;
    a bit retention device received in the opening;
    an actuator sleeve substantially surrounding the shaft and having an internal wall that engages the bit retention device, wherein the actuator sleeve is moveable between a rearward position in which the internal wall pushes the bit device radially inward toward the cavity to engage a tool bit that is received in the cavity, and a frontward position in which the internal wall allows the bit retention device to move radially outward from the cavity to disengage from a tool bit that is received in the cavity;
    a first spring having a first portion substantially surrounding the shaft rearward of the opening without biasing the actuator sleeve, and a second portion projecting at least partially into the opening to bias the bit retention device toward the front end of the shaft; and a second spring substantially surrounding the shaft forward of the opening to bias the actuator sleeve toward the rearward position.

19. The tool bit holder of claim 18, wherein the internal wall comprises a first ramp surface that is inclined relative to the longitudinal axis at a first ramp angle and a second ramp surface that is inclined relative to the longitudinal axis at a second ramp angle that is smaller than the first ramp angle, wherein the first ramp surface is configured to push the bit retention member radially inward to retain a first bit having an annular groove in a surface thereof and the second ramp surface is configured to push the bit retention member radially inward to retain a second bit without an annular groove in a surface thereof.

20. The tool bit holder of claim 18, further comprising a power tool housing at least partially receiving the shaft, the power tool housing including a motor and a transmission coupled to the motor, wherein the transmission transmits power from the motor to the shaft.

* * * * *